(12) United States Patent
Aggarwal et al.

(10) Patent No.: US 12,700,066 B2
(45) Date of Patent: Aug. 4, 2026

(54) MULTI-STAGE PROCESSING OF FOVEATED IMAGE DATA

(71) Applicant: QUALCOMM Incorporated, San Diego, CA (US)

(72) Inventors: Saurabh Aggarwal, Bengaluru (IN); Shrey Shailesh Gadiya, Bengaluru (IN); Praveen Sekar, Bangalore (IN); Amrit Anand Amresh, Bangalore (IN); Animesh Behera, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 18/638,562

(22) Filed: Apr. 17, 2024

(65) Prior Publication Data

US 2025/0328986 A1 Oct. 23, 2025

(51) Int. Cl.
  *G06T 5/50* (2006.01)
  *G06T 5/20* (2006.01)
  *G06T 5/70* (2024.01)
  *G06V 10/56* (2022.01)

(52) U.S. Cl.
  CPC .................. *G06T 5/50* (2013.01); *G06T 5/20* (2013.01); *G06T 5/70* (2024.01); *G06V 10/56* (2022.01); *G06T 2207/20028* (2013.01); *G06T 2207/20221* (2013.01)

(58) Field of Classification Search
  CPC .... G06T 5/50; G06T 5/20; G06T 5/70; G06T 2207/20028; G06T 2207/20221; G06T 2207/10024; G06T 2207/20016; G06V 10/56

See application file for complete search history.

(56) References Cited

U.S. PATENT DOCUMENTS

2019/0043167 A1* 2/2019 Steyskal ............ G02B 27/0172

* cited by examiner

*Primary Examiner* — Chong Wu
(74) *Attorney, Agent, or Firm* — QUALCOMM Incorporated

(57) ABSTRACT

Systems and techniques are described herein for processing image data. For instance, a method for processing image data is provided. The method may include receiving a first plurality of rows of first image data, the first image data representing a field of view at a first resolution; receiving a second plurality of rows of second image data, the second image data representing a portion of the field of view at a second resolution, wherein the first resolution is less than the second resolution; generating processed first image data based on the first plurality of rows of the first image data and a first kernel; generating processed second image data based on the second plurality of rows of the second image data, a second kernel, and the processed first image data; and outputting the processed first image data and the processed second image data.

20 Claims, 16 Drawing Sheets

Image-Processing System 100

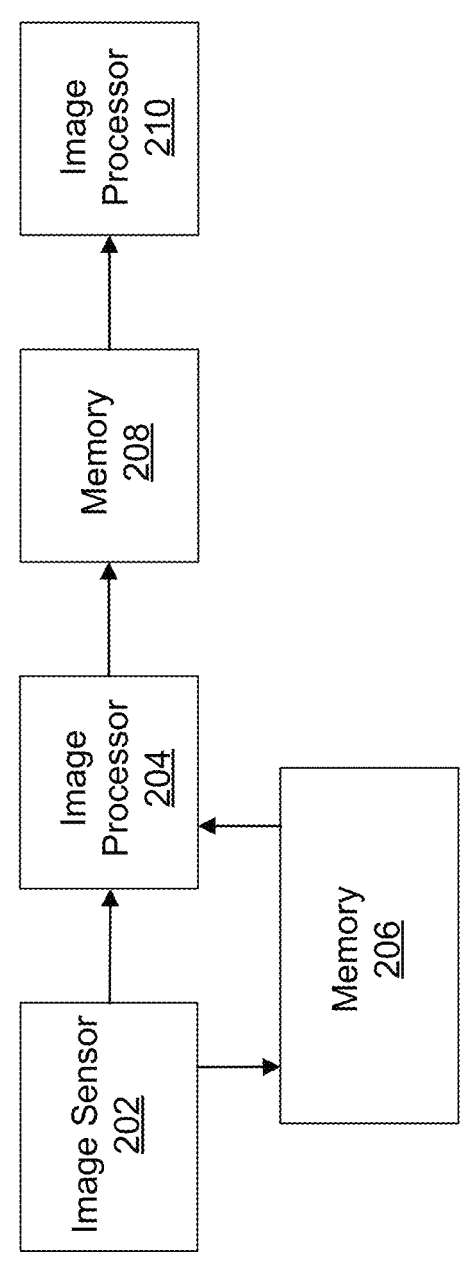
FIG. 2

504
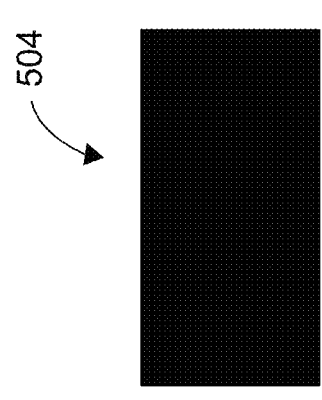
506
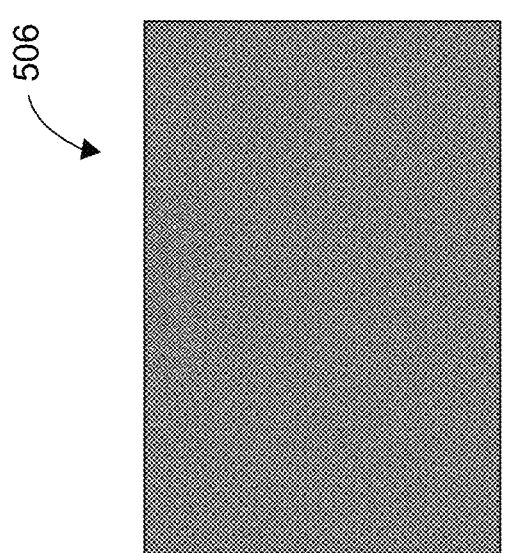
508
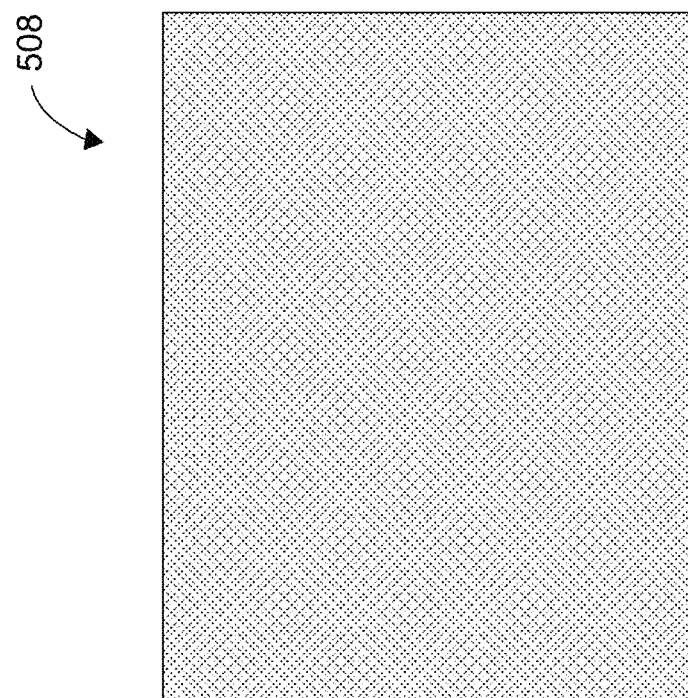
FIG. 5B

Figure 10:
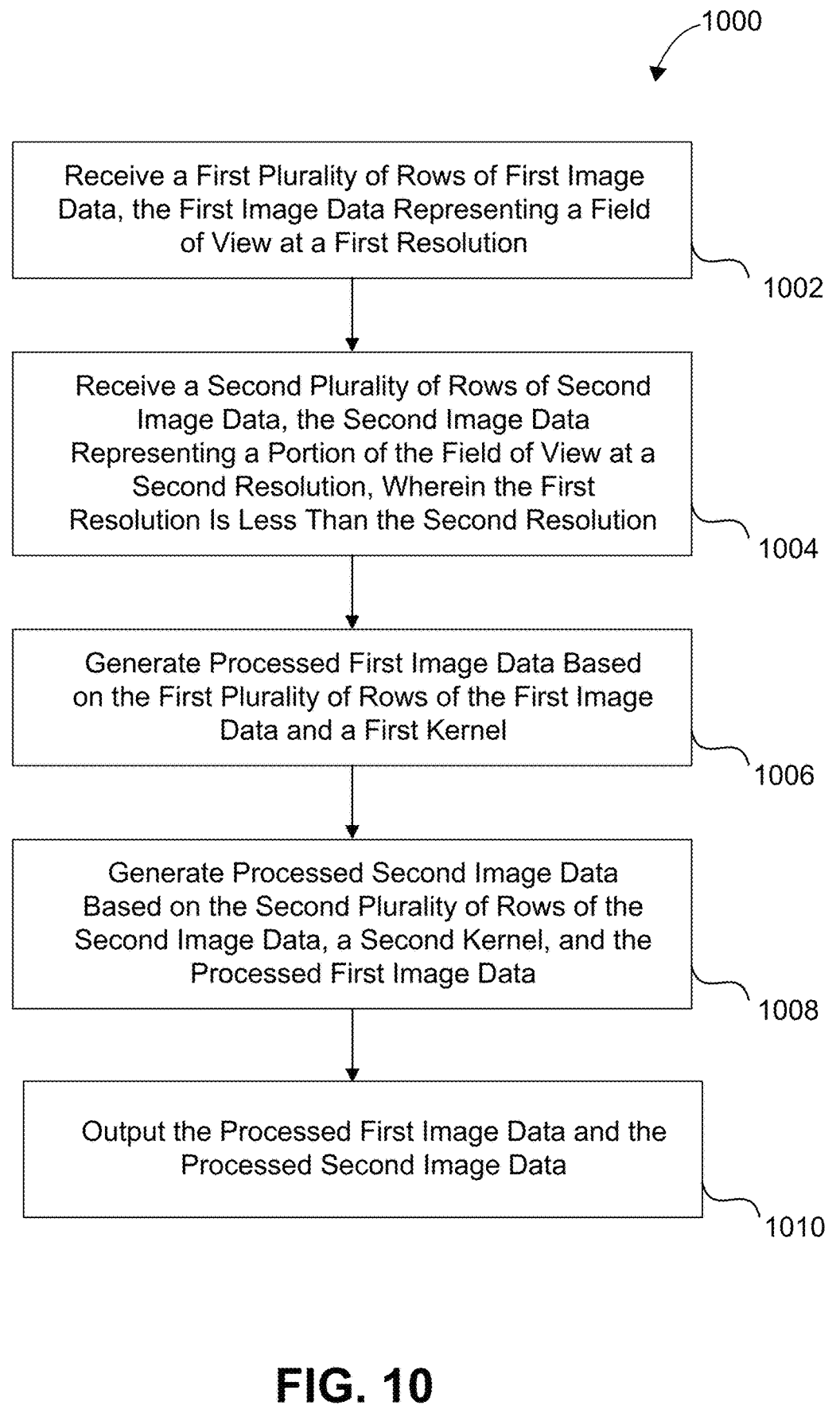

1000

Receive a First Plurality of Rows of First Image Data, the First Image Data Representing a Field of View at a First Resolution

1002

Receive a Second Plurality of Rows of Second Image Data, the Second Image Data Representing a Portion of the Field of View at a Second Resolution, Wherein the First Resolution Is Less Than the Second Resolution

1004

Generate Processed First Image Data Based on the First Plurality of Rows of the First Image Data and a First Kernel

1006

Generate Processed Second Image Data Based on the Second Plurality of Rows of the Second Image Data, a Second Kernel, and the Processed First Image Data

1008

Output the Processed First Image Data and the Processed Second Image Data

MULTI-STAGE PROCESSING OF FOVEATED IMAGE DATA

TECHNICAL FIELD

The present disclosure generally relates to foveated image data. For example, aspects of the present disclosure include systems and techniques for processing foveated image data using a multi-stage image-processing technique.

BACKGROUND

Multi-resolution denoising is one way to improve the signal-to-noise ratio (SNR) of an image. However, multi-resolution denoising may be computationally expensive, for example, multi-resolution denoising may take processing time, consume power, use processing bandwidth, and/or use communication bandwidth. For example, conventional multi-resolution-denoising techniques may not be able to perform multi-resolution denoising at a rate to match an image-capture rate of an image-capture device or a display rate of a display device. Other multi-stage image-processing techniques, include, as examples, spatial denoising, temporal denoising, tone mapping, and multi-scale feature extraction.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for processing image data. According to at least one example, a method is provided for processing image data. The method includes: receiving a first plurality of rows of first image data, the first image data representing a field of view at a first resolution; receiving a second plurality of rows of second image data, the second image data representing a portion of the field of view at a second resolution, wherein the first resolution is less than the second resolution; generating processed first image data based on the first plurality of rows of the first image data and a first kernel; generating processed second image data based on the second plurality of rows of the second image data, a second kernel, and the processed first image data; and outputting the processed first image data and the processed second image data.

In another example, an apparatus for processing image data is provided that includes at least one memory and at least one processor (e.g., configured in circuitry) coupled to the at least one memory. The at least one processor configured to: receive a first plurality of rows of first image data, the first image data representing a field of view at a first resolution; receive a second plurality of rows of second image data, the second image data representing a portion of the field of view at a second resolution, wherein the first resolution is less than the second resolution; generate processed first image data based on the first plurality of rows of the first image data and a first kernel; generate processed second image data based on the second plurality of rows of the second image data, a second kernel, and the processed first image data; and output the processed first image data and the processed second image data.

In another example, a non-transitory computer-readable medium is provided that has stored thereon instructions that, when executed by at least one processor, cause the at least one processors to: receive a first plurality of rows of first image data, the first image data representing a field of view at a first resolution; receive a second plurality of rows of second image data, the second image data representing a portion of the field of view at a second resolution, wherein the first resolution is less than the second resolution; generate processed first image data based on the first plurality of rows of the first image data and a first kernel; generate processed second image data based on the second plurality of rows of the second image data, a second kernel, and the processed first image data; and output the processed first image data and the processed second image data.

In another example, an apparatus for processing image data is provided. The apparatus includes: means for receiving a first plurality of rows of first image data, the first image data representing a field of view at a first resolution; means for receiving a second plurality of rows of second image data, the second image data representing a portion of the field of view at a second resolution, wherein the first resolution is less than the second resolution; means for generating processed first image data based on the first plurality of rows of the first image data and a first kernel; means for generating processed second image data based on the second plurality of rows of the second image data, a second kernel, and the processed first image data; and means for outputting the processed first image data and the processed second image data.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 2 is a block diagram illustrating an example of data flow in a camera system, according to various aspects of the present disclosure;

FIG. 5B is a block diagram illustrating regions as may be captured by an image sensor and provided to the systems and techniques, according to various aspects of the present disclosure;

FIG. 10 is a flow diagram illustrating another example process for performing multi-stage image processing of foveated image data, in accordance with aspects of the present disclosure;

DETAILED DESCRIPTION

Figure 1:
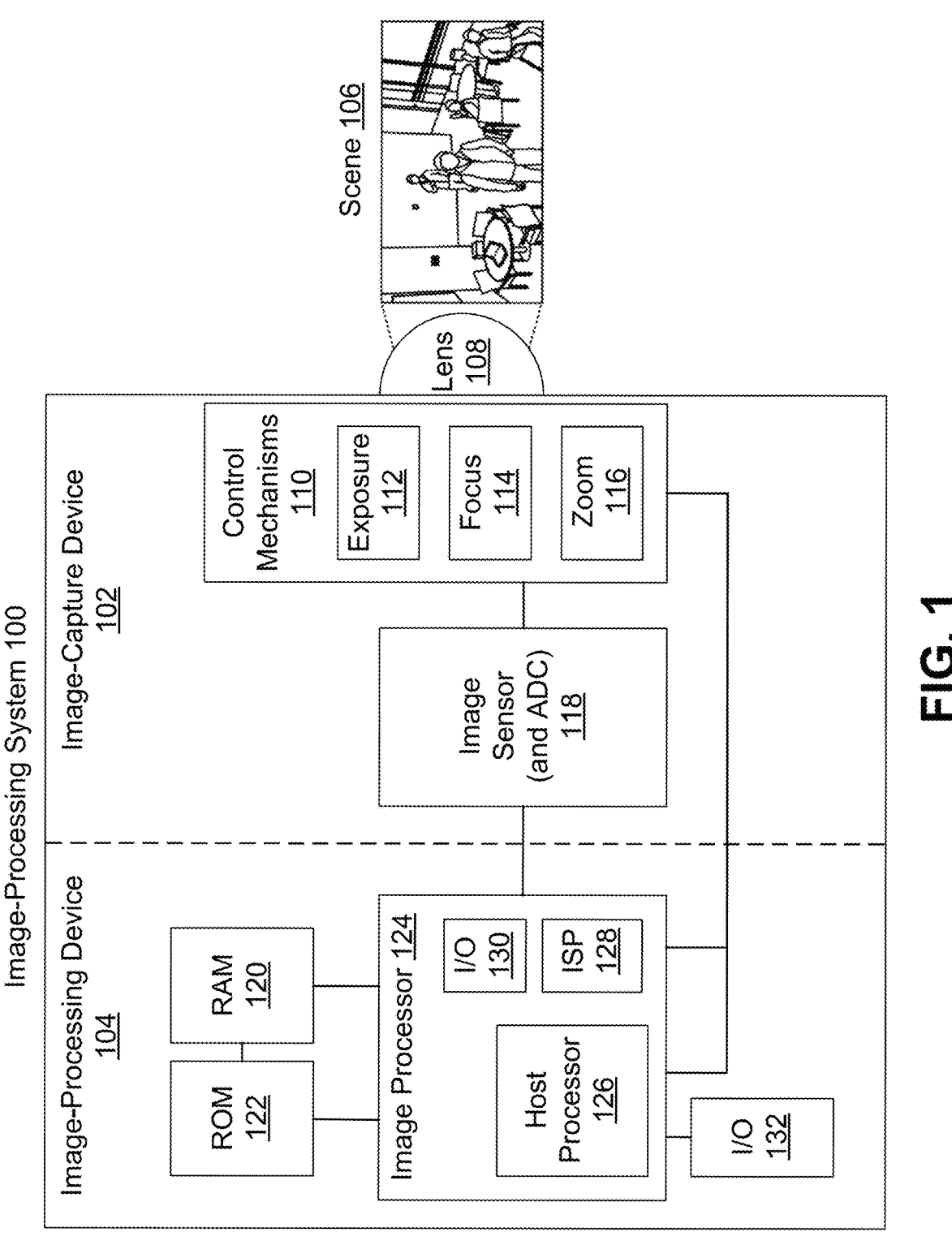
FIG. 1 is a block diagram illustrating an example architecture of an image processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A foveated image is an image with different resolution in different regions within the image. For example, a foveated image may include a highest resolution in a region of interest (ROI) and lower-resolution regions around the ROI (e.g., at peripheral regions around the ROI). Some foveated images include several portions with several different (e.g., tiered) resolutions. The term "foveation" may be based on the fovea of an eye (e.g., the center of the eye's retina) which is the portion of the retina with the sharpest visual acuity.

Some devices may capture, modify, and/or render foveated images based on a gaze, or likely gaze, of a user. For example, the devices may determine where a viewer is gazing, or where a user is likely to gaze, within an image frame and determine an ROI for the image based on the gaze, or likely gaze. The device may then capture, modify, and/or render image data to have the highest resolution in the ROI and lower resolution outside the ROI.

In some aspects, an image sensor can be configured to capture a part of an image frame in high resolution, which is referred to as a fovea region or an ROI, and other parts of the image frame at a lower resolution using various techniques (e.g., pixel binning). A lower-resolution portion may be referred to as a peripheral region. In some aspects, an image signal processor can process a foveated region or ROI at a higher resolution and a peripheral region at a lower resolution. In any case, the image sensor and/or the image signal processor (ISP) can produce high-resolution output for an ROI (e.g., a region of the image frame where the user is focusing, or is likely to focus) and can produce a low-resolution output (e.g., a binned output) for the peripheral region (e.g., a region of the image frame where the user is not focusing, or is less likely to focus).

As mentioned previously, multi-resolution denoising is one way to improve the signal-to-noise ratio (SNR) of an image. However, multi-resolution denoising may be computationally expensive, for example, multi-resolution denoising may take processing time, consume power, use processing bandwidth, and/or use communication bandwidth. For example, conventionally, multi-resolution processing algorithms may be performed in an offline engine which add latency to the end-to-end processing. As such, conventional multi-resolution-denoising techniques may not be able to perform multi-resolution denoising at a rate to match an image-capture rate of an image-capture device or a display rate of a display device. In video-see-through (VST) systems, a mismatch between when images are captured and when the images are displayed may be referred to as a photon-to-photon latency. A photon-to-photon latency of conventional multi-resolution-denoising techniques may cause a user discomfort and/or sickness.

Conventional multi-resolution-denoising techniques start by processing the lowest-resolution portion of an image frame followed by successively higher resolution-portions of the image frame. Hence, multi-resolution denoising is traditionally done in post-processing which adds to latency. As such, conventional multi-resolution denoising may not be useful in video see through (VST) use-cases, in extended reality (XR), or other real-time applications where latency is a concern.

Systems, apparatuses, methods (also referred to as processes), and computer-readable media (collectively referred to herein as "systems and techniques") are described herein for processing foveated image data using a multi-stage image-processing technique. For example, the systems and techniques may apply multi-resolution denoising to foveated images.

The systems and techniques may receive foveated image data as multiple sets of image data. For example, the systems and techniques may receive first image data representing an entirety of a field of view of an imaging device. The first image data may have a first resolution (e.g., a relatively low resolution). The systems and techniques may also receive second image data representing a portion of the field of view of the imaging device (e.g., a narrower field of view than the entire field of view). The second image data may have a second resolution (e.g., a higher resolution than the first resolution). The systems and techniques may also receive third image data representing a portion of the field of view of the imaging device (e.g., an ROI). The third image data may have a third resolution (e.g., a higher resolution than the second resolution).

The systems and techniques may receive image data in a row-by-row fashion. For example, the systems and techniques may receive one row of image data followed by a subsequent row of the image data (e.g., in a data stream) until the entirety of the image data is received. The systems and techniques may receive the first image data (of the foveated image data) in a row-by-row fashion. Similarly, the systems and techniques may receive the second image data (of the foveated image data) in a row-by-row fashion.

The systems and techniques my process the foveated image data (e.g., of the various sets of image data) as the foveated image data is received (e.g., in a row-by-row fashion). As an example, the systems and techniques may process image data using kernels. In the present disclosure, the term kernel may refer to a matrix of values that may be applied to pixel values of pixels of image data (e.g., by multiplying pixel values of the image data with corresponding values of the matrix). Kernels may be used to, for example, blur, sharpen, or emboss, images or to detect edges in images. A kernel may have a size (e.g., a number of rows and columns of the matrix).

To process image data using a kernel, the systems and techniques may first receive and buffer a number of rows of image data. The systems and techniques may buffer a number of rows that is at least as large as the number of rows of the kernel. For example, to process the first image data with a 5×5 kernel (e.g., a kernel including five rows and five columns), the systems and techniques may receive and buffer five rows of the first image data, then apply the kernel to the five rows of the first image data. When the systems and techniques receive the sixth row of the first image data, the systems and techniques may apply the kernel to the second through sixth row of the first image data, and so on.

As mentioned previously, the systems and techniques may receive sets of image data of foveated image data (e.g., first image data in a first data stream, second image data in a second image stream, and third image data in a third image stream). The sets of image data may be received in a row-by-row fashion. The systems and techniques may process the first image data (e.g., the lowest-resolution image data) in a row-by-row fashion as it is received. The systems and techniques may use the processed first image data (which may include image data and a mask) (e.g., as it is processed in a row-by-row fashion) to process the second image data as it is received (e.g., as it is processed in a row-by-row fashion). Further, the systems and techniques may use the processed second image data (which may include image data and a mask) (e.g., as it is processed in a row-by-row fashion) to process the third image data as it is received (e.g., as it is processed in a row-by-row fashion).

Because some ISPs, (e.g., front-end ISPs) process image frames in a row-by-row fashion, the systems and techniques pass row-by-row results of spatial denoising in lower-resolution contexts/front-end hardware (HW) instances to higher resolution contexts/front-end HW instances. By passing row-by-row results from lower-resolution contexts to higher-resolution contexts, the systems and techniques can perform multi-resolution denoising faster than other techniques. For example, in some aspects, the systems and techniques may perform multi-resolution denoising in real-time which may greatly reduce the post-processing latency.

In the present disclosure, multi-resolution denoising is given as an example of a multi-stage image-processing technique. The present disclosure contemplates other multi-stage image-processing techniques, including, as examples, spatial denoising, temporal denoising, tone mapping, and multi-scale feature extraction.

In the present disclosure, examples three stages are used as examples of multi-stage processing. The systems and techniques may be scaled to apply to any number of stages, including two, four, or more.

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, and/or zoom based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, and/or one or more zoom-control mechanisms 116. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an infrared (IR) cut filter, an ultraviolet (UV) cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
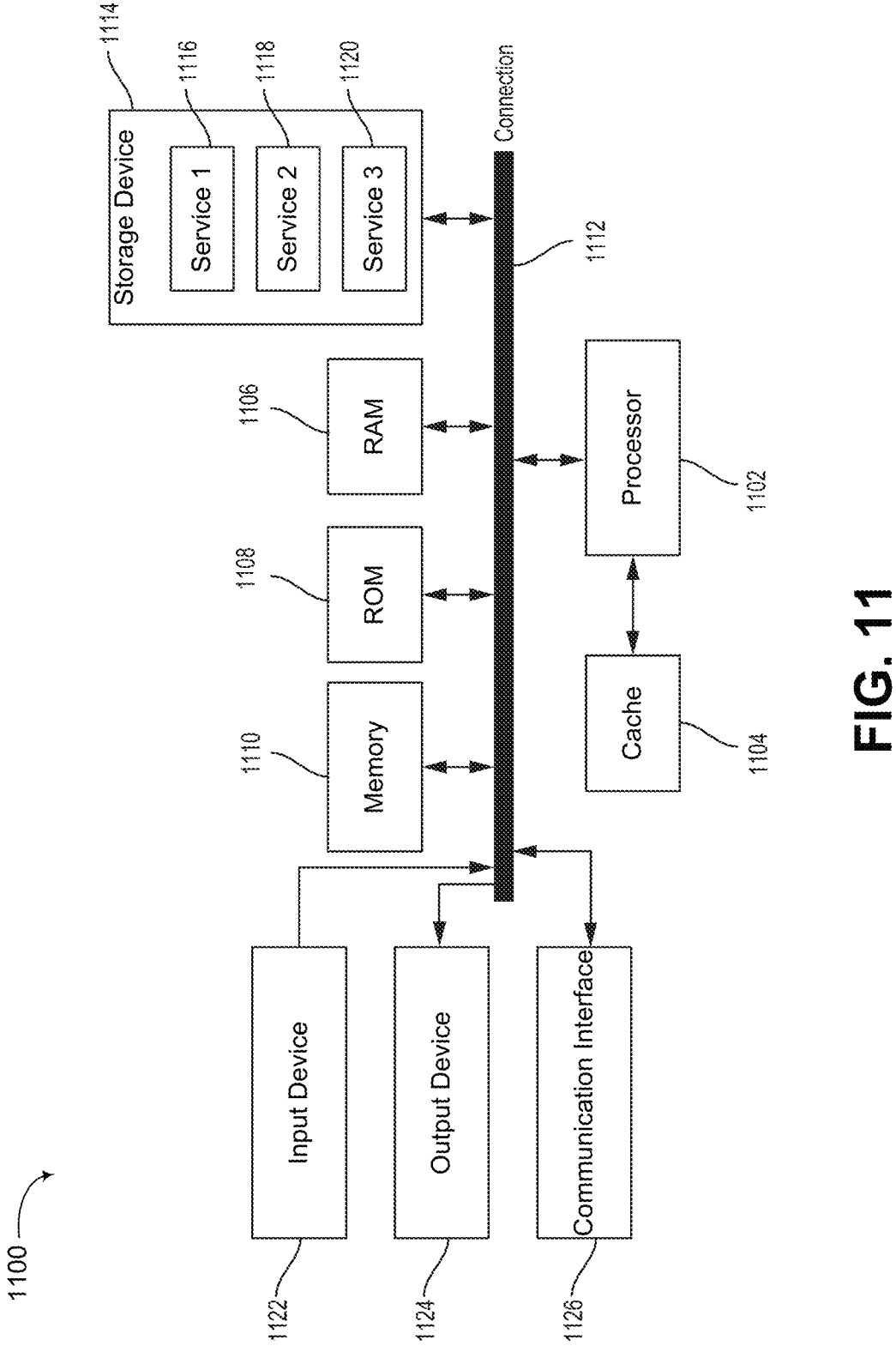
FIG. 11 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 1100 of FIG. 11. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., third generation (3G), fourth generation (4G) or long-term evolution (LTE), fifth generation (5G), etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in random-access memory (RAM) 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously-discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as a camera system (e.g., a digital camera, an Internet Protocol IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an head-mounted device (HMD), smart glasses, etc.), an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 1100 shown in FIG. 11 and further described below can include the image-processing system 100, the image-capture device 102, the image-processing device 104, or a combination thereof.

FIG. 2 is a block diagram illustrating an example of data flow in a camera system (e.g., image-processing system 100 of FIG. 1), according to various aspects of the present disclosure. System 200 includes an image sensor 202 (e.g., a camera sensor subsystem for obtaining image frames capturing scenes), a first image processor 204 (e.g., an inline image processor, which may be referred to as a front-end image processor, an image front end (IFE), an image signal processor (ISP), or thin front end (TFE)), and a second image processor 210 (e.g., a back-end image processor, an offline image processor which may be referred to as an offline processing engine or image processing engine (IPE)). Image sensor 202 may be an example of one or more elements of image-capture device 102 of FIG. 1, including, for example, lens 108, control mechanism 110, exposure-control mechanism 112, focus-control mechanism 114, zoom-control mechanism 116, and/or image sensor 118. Image processor 204 and image processor 210 may both be implemented in image processor 124 of FIG. 1. Alternatively, image processor 210 may be implemented by a central processing unit (CPU), or other processor.

During operation, image sensor 202 may provide image data (e.g., as a stream pixels) to image processor 204. In some cases, image sensor 202 may provide image data to image processor 204 directly, for example, via a Mobile Industry Processor Interface (MIPI). In such cases, the processing by image processor 204 may be referred to as inline processing because image processor 204 may process the pixels in line with the operation of the image sensor 202 (e.g., as the pixels are received from image sensor 202 via the MIPI). In other cases, system 200 may include a memory 206 and image sensor 202 may write image data (e.g., a stream of pixels) to memory 206 and image processor 204 may read the image data (e.g., the stream of pixels) from memory 206. In any case, after image processor 204 receives the pixels from image sensor 202, image processor 204 can process the pixels (e.g., by processing the pixels one row at a time). Image processor 204 may perform one or more operations related to, for example, Bad Pixel Correction (BPC), lens correction, phase-detection pixel correction, demosaicing, lateral chromatic aberration correction, Bayer filtering, adaptive Bayer filtering, tone mapping, noise reduction, etc. After image processor 204 has processed one or more of the rows of the image frame, the image processor 204 can transfer the processed sensor data to memory 208.

Image processor 210 can read the image frames from memory 208. Memory 208 may be, or may include, a double data rate (DDR) synchronous dynamic random-access memory (SDRAM) or any other memory device. Image processor 210 may retrieve the processed image frames from memory 208 and further process the image frames. For example, image processor 210 may perform one or more operations related to noise reduction, tone mapping, and/or motion stabilization, etc. on the processed image frames.

Image processor 204 may be referred to as a "front" or "front-end" processor and image processor 210 may be referred to as a "back" or "back-end" processor because image processor 204 is closer to image sensor 202 than image processor 210 is to image sensor 202. In some aspects, there may be one or more additional processors between image sensor 202 and image processor 204. Thus, though image processor 204 may be referred to as a "front-end" processor, it may not be the first processor to process image data from image sensor 202. Additionally or alternatively, there may be one or more additional processors after image processor 210. Thus, image processor 210 may not be a last processor to process image data from image sensor 202.

Figure 3A:
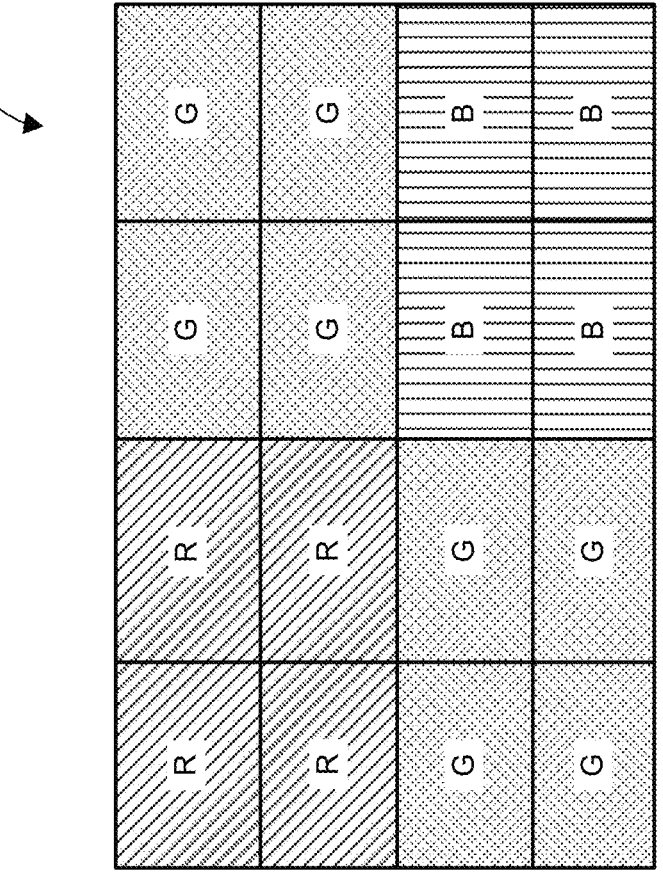
FIG. 3A is a diagram illustrating a quad-color filter array.
Figure 3B:
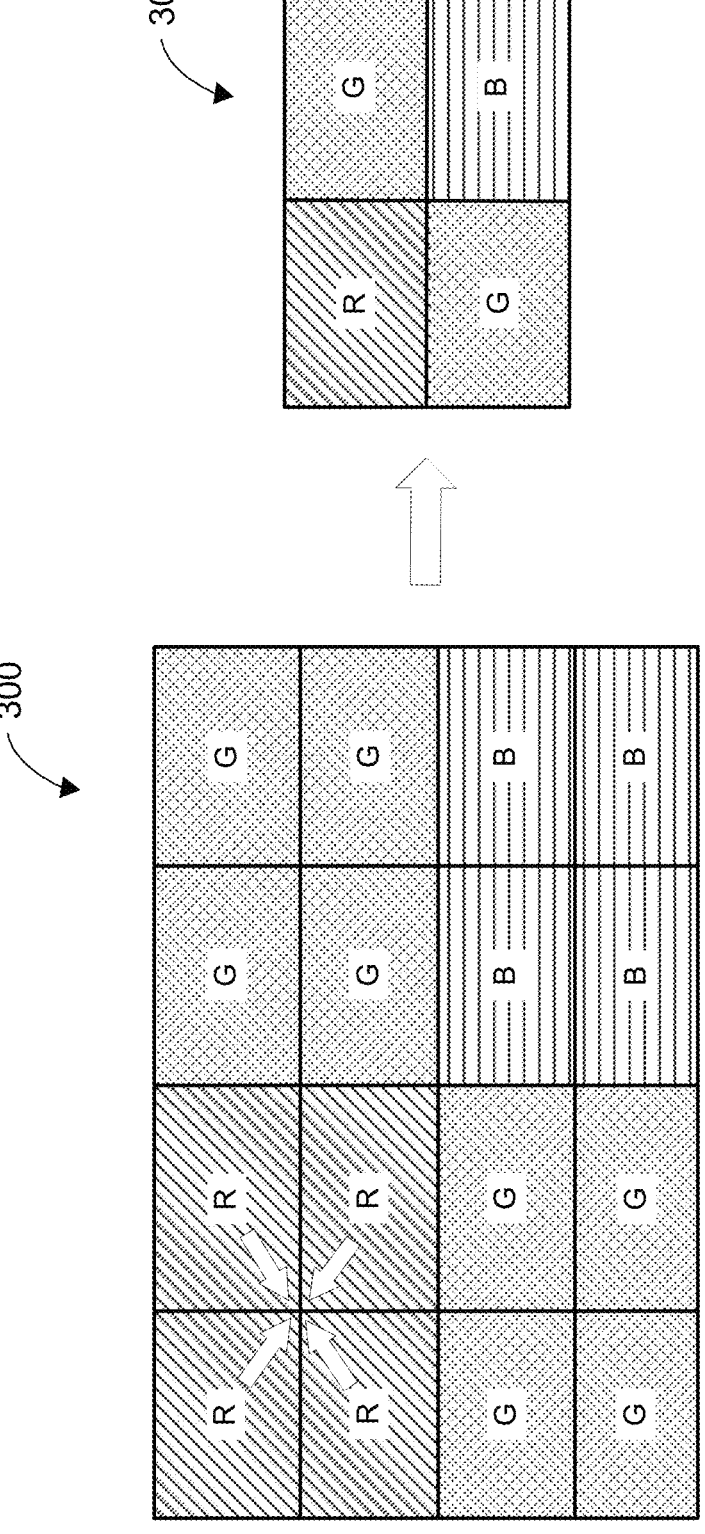
FIG. 3B is a diagram illustrating an example of a binning pattern resulting from application of a binning process to quad-color filter array.

As noted above, a color filter array can cover the one or more arrays of photodiodes (or other photosensitive elements) of image sensor 118. The color filter array can include a quad-color filter array in some implementations, such as quad-color filter array 300 shown in FIG. 3A. In certain situations, after an image is captured by image sensor 118 (e.g., before the image is provided to and processed by image processor 124), image sensor 118 can perform a binning process to bin quad-color filter array 300 pattern into a binned Bayer pattern. For instance, as shown in FIG. 3B (described below), quad-color filter array 300 pattern can be converted to a Bayer color filter array pattern (with reduced resolution) by applying the binning process. The binning process can increase signal-to-noise ratio (SNR), resulting in increased sensitivity and reduced noise in the captured image. In one illustrative example, binning can be performed in low-light settings when lighting conditions are poor, which can result in a high-quality image with higher brightness characteristics and less noise.

FIG. 3B is a diagram illustrating an example of a binning pattern 302 resulting from application of a binning process to quad-color filter array 300. The example illustrated in FIG. 3B is an example of a binning pattern 302 that results from a 2×2 quad color filter array binning process, where an average of each 2×2 set of pixels in quad-color filter array 300 results in one pixel in binning pattern 302. For example, an average of the four pixels captured using the 2×2 set of red (R) color filters in the quad-color filter array 300 can be determined. The average R value can be used as the single R component in binning pattern 302. An average can be determined for each 2×2 set of color filters of quad-color filter array 300, including an average of the top-right pair of 2×2 green (G) color filters of quad-color filter array 300 (resulting in the top-right G component in binning pattern 302), the bottom-left pair of 2×2 G color filters of quad-color filter array 300 (resulting in the bottom-left G component in binning pattern 302), and the 2×2 set of blue (B) color filters (resulting in the B component in binning pattern 302) of quad-color filter array 300.

The size of binning pattern 302 is a quarter of the size of the quad-color filter array 300. As a result, a binned image resulting from the binning process is a quarter of the size of an image processed without binning. In one illustrative example where a 48-megapixel (48 MP or 48 M) image is captured by the image sensor 118 using a 2×2 quad-color filter array 300, a 2×2 binning process can be performed to generate a 12 MP binned image. The reduced-resolution image can be upsampled (upscaled) to a higher resolution in some cases (e.g., before or after being processed by image processor 124).

In some examples, when binning is not performed, a quad color filter array pattern can be remosaiced (using a remosaicing process) by the image sensor 118 to a Bayer color filter array pattern. For example, the Bayer color filter array is used in many ISPs. To utilize all ISP modules or filters in such ISPs, a remosaicing process may need to be performed to remosaic from quad-color filter array 300 pattern to the Bayer color filter array pattern. The remosaicing of quad-color filter array 300 pattern to a Bayer color filter array pattern allows an image captured using quad-color filter array 300 to be processed by ISPs that are designed to process images captured using a Bayer color filter array pattern.

Figure 4:
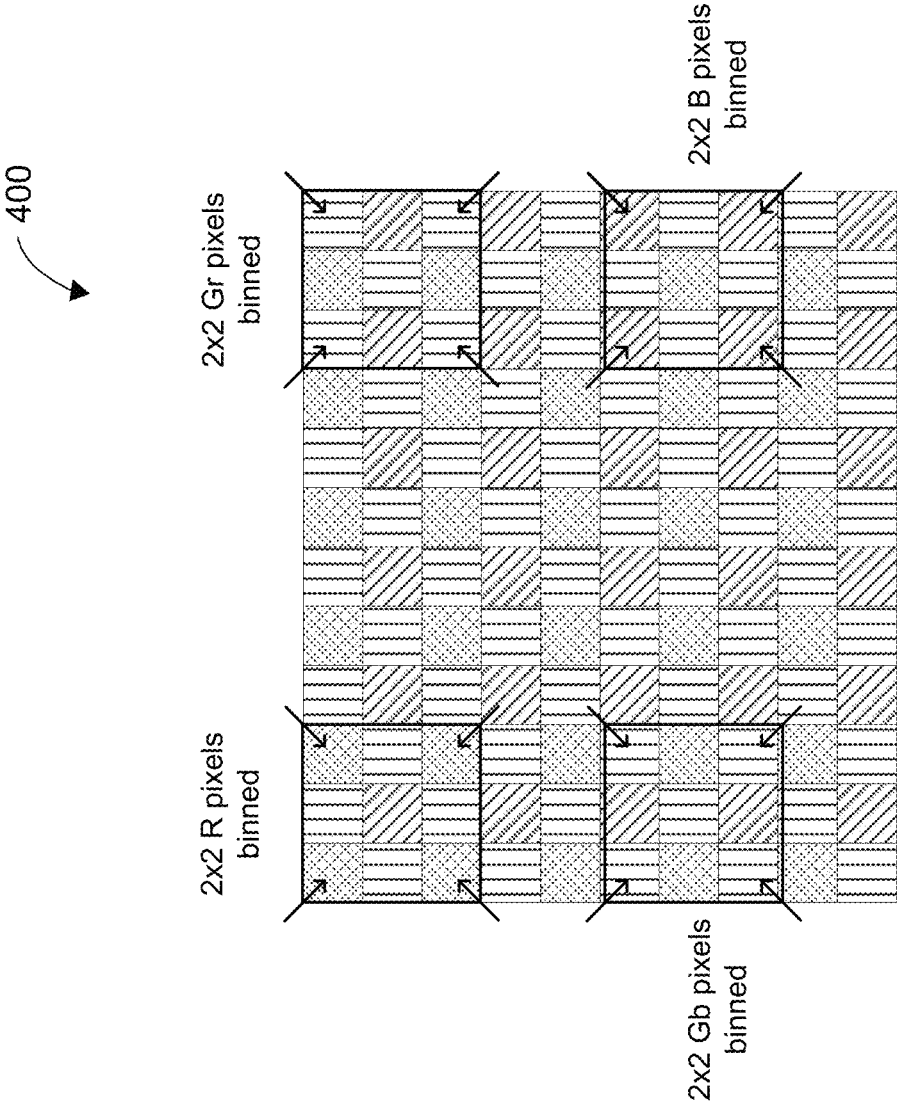
FIG. 4 is a diagram illustrating an example of a binning process applied to a Bayer pattern of a Bayer color filter array.

FIG. 4 is a diagram illustrating an example of a binning process applied to a Bayer pattern of a Bayer color filter array 400. As shown, the binning process bins the Bayer pattern by a factor of two both along the horizontal and vertical direction. For example, taking groups of two pixels in each direction (as marked by the arrows illustrating binning of a 2×2 set of red (R) pixels, two 2×2 sets of green (Gr) pixels, and a 2×2 set of blue (B) pixels), a total of four pixels are averaged to generate an output Bayer pattern that is half the resolution of the input Bayer pattern of the Bayer color filter array 400. The same operation may be repeated across all of the red, blue, green (beside the red pixels), and green (beside the blue pixels) channels.

Figure 5A:
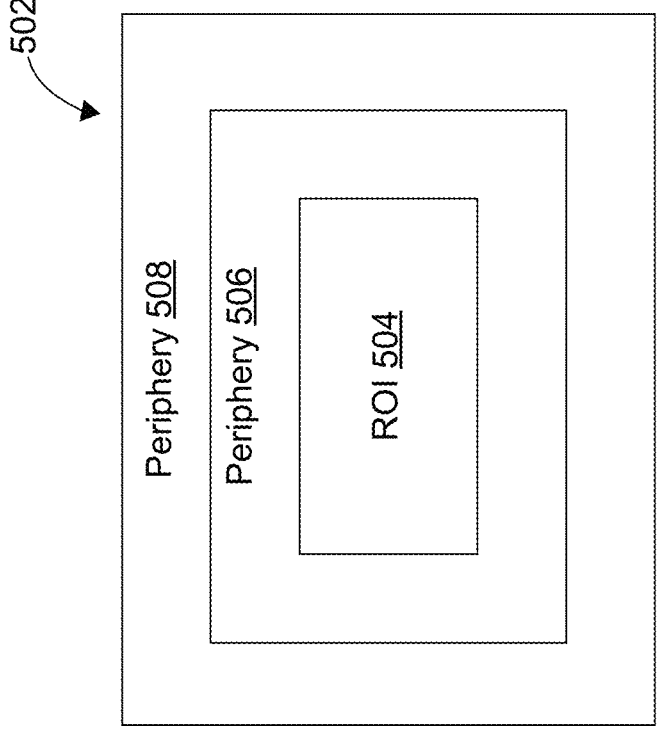
FIG. 5A is a block diagram illustrating an example image, and example regions of image, according to various aspects of the present disclosure.

As noted previously, a foveated image is an image with different resolution in different regions within the image. FIG. 5A is a block diagram illustrating an example image 502, and example regions of image 502, according to various aspects of the present disclosure. For example, image 502 includes a region of interest (ROI) 504. Image 502 also includes a periphery 506 around ROI 504 and a periphery 508 around periphery 506. According to various aspects of the present disclosure, image 502 may be foveated. For example, ROI 504 may include pixels at a highest resolution, periphery 506 may include pixels at a lower resolution, and periphery 508 may include pixels at a lowest resolution. For example, periphery 506 may include pixels binned according to a first scaling factor (e.g., 2×) and periphery 508 may include pixels binned according to a second scaling factor (e.g., 4×).

Foveated sensing allows a camera sensor to stream high-resolution fovea-region image data (e.g., pixel values of ROI 504) and downscaled periphery-regions image data (e.g., periphery 506 and/or periphery 508) simultaneously in different channels. Some image signal processors (ISPs) can perform front-end processing of multiple image-data streams simultaneously. Such processing may allow for use-cases such as concurrent cameras, video high dynamic resolution (HDR) (with different exposure frames from sensors simultaneously). Such ISPs may either use multiple instances of hardware (HW) for front-end processing or include a single front-end HW that can process multiple image-data streams in different contexts. In some fields, such as extended reality (XR), ISPs are being used to process incoming image data at different resolutions, (e.g., obtained from foveated sensing) simultaneously.

For example, systems and techniques of the present disclosure may receive foveated image data. For example, in some aspects, an image sensor may be configured to capture a part of an image frame in high resolution (e.g., ROI 504), and other parts of the image frame (e.g., periphery 506 and periphery 508) at lower resolutions using various techniques (e.g., pixel binning).

FIG. 5B is a block diagram illustrating periphery 508, periphery 506, and ROI 504 as may be captured by an image sensor and provided to the systems and techniques, according to various aspects of the present disclosure. Periphery 508 may include pixel values for an entirety of the image frame of image 502. For example, periphery 508 may include pixel values in regions for which periphery 506 and/or ROI 504 also include pixels. In other words, periphery 508 may be a filled rectangle and not a rectangular frame surrounding periphery 506. Similarly, periphery 506 may include pixel values for the region for which ROI 504 includes pixels. In other words, periphery 506 may be a filled rectangle and not a rectangular frame surrounding ROI 504.

Further, a density of pixel values of periphery 508, periphery 506, and ROI 504 is illustrated in FIG. 5B. For example, ROI 504 may include pixel values at a higher density than periphery 506; further periphery 506 may include pixel values at a higher density than periphery 508. To illustrate this, ROI 504 is illustrated in FIG. 5B as black. The blackness of ROI 504 illustrates that ROI 504 includes a highest (of ROI 504, periphery 506 and periphery 508) density of pixel values. Periphery 506 is illustrated with a 25% black fill pattern. The fill pattern of periphery 506 indicates that periphery 506 includes 25% as many pixel values per frame region as ROI 504. For example, in the region defined by ROI 504, periphery 506 may include 25% as many pixel values as ROI 504. For instance, ROI 504 may include M rows and N columns of pixel values. periphery 506 may include M/2 rows and N/2 columns of pixel values corresponding to ROI 504. Further, periphery 508 may include M/4 rows and N/4 columns of pixel values corresponding to ROI 504.

Figure 6:
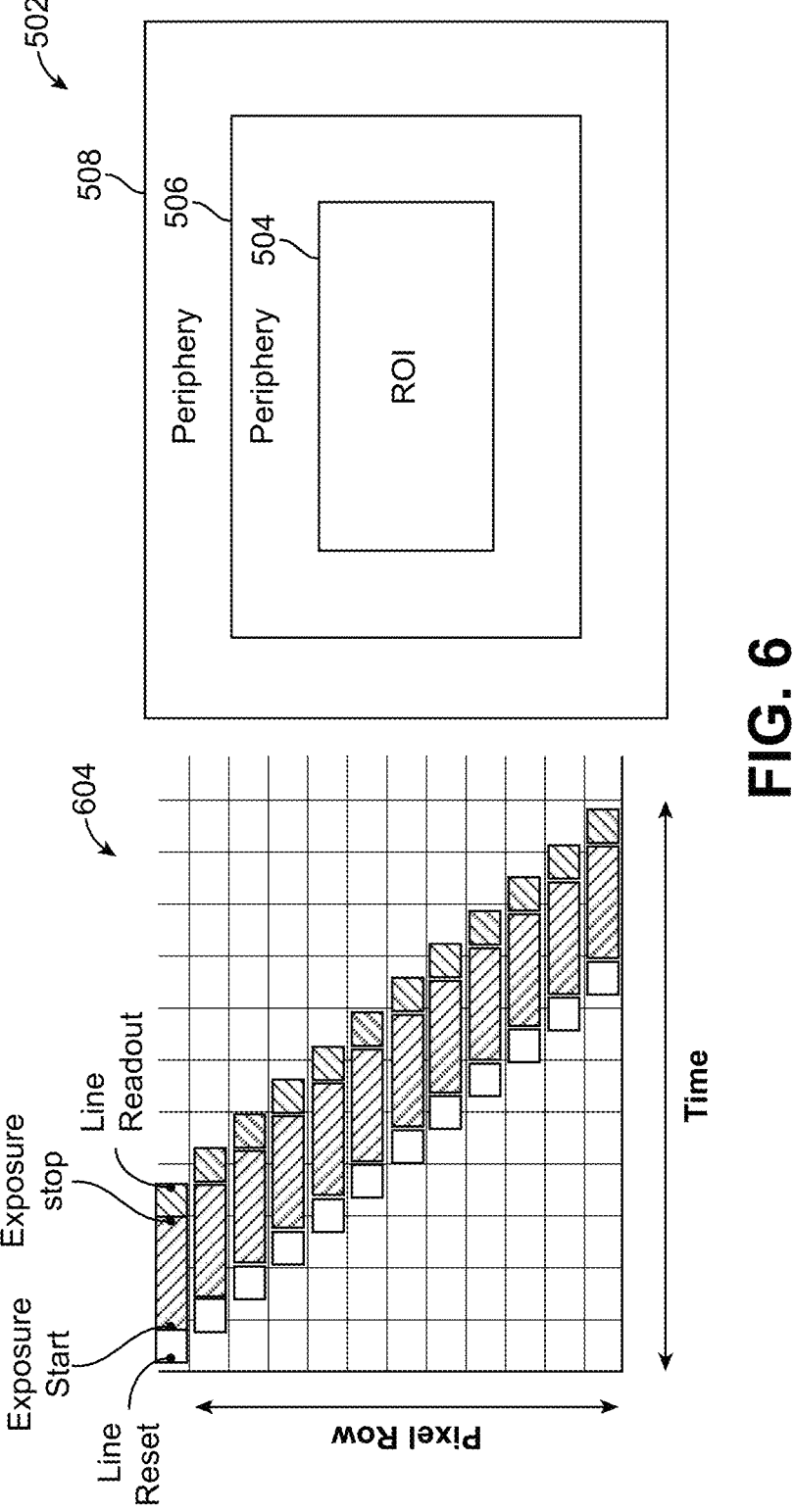
FIG. 6 is a diagram and a graph relating to a readout process of a rolling-shutter image sensor.

FIG. 6 is a diagram and a graph relating to a readout process of a rolling-shutter image sensor. For example, diagram 604 illustrates the process of rows of an image sensor (along the y-axis) as the rows are expose to light (e.g., between "exposure start" and "exposure stop") as measured along the x-axis of "time." Diagram 604 illustrates that an exposure of a row may begin at a first time and conclude at a later time. Following the exposure, the row may be readout-pixel values for the row may be transferred (e.g., to an ISP) and/or stored (e.g., at a memory). As is illustrated in diagram 604 of FIG. 6, pixel values of image data may be generated in a row-by-row fashion.

In some aspects, pixel values of ROI 504, periphery 506, and periphery 508 may be readout and/or transferred in three separate data streams. For example, in some aspects, all pixel values of all rows of image 502 may be readout and pixel values of periphery 506 and periphery 508 may be binned (e.g., according to a 2× and 4× binning respectively).

Figure 7:
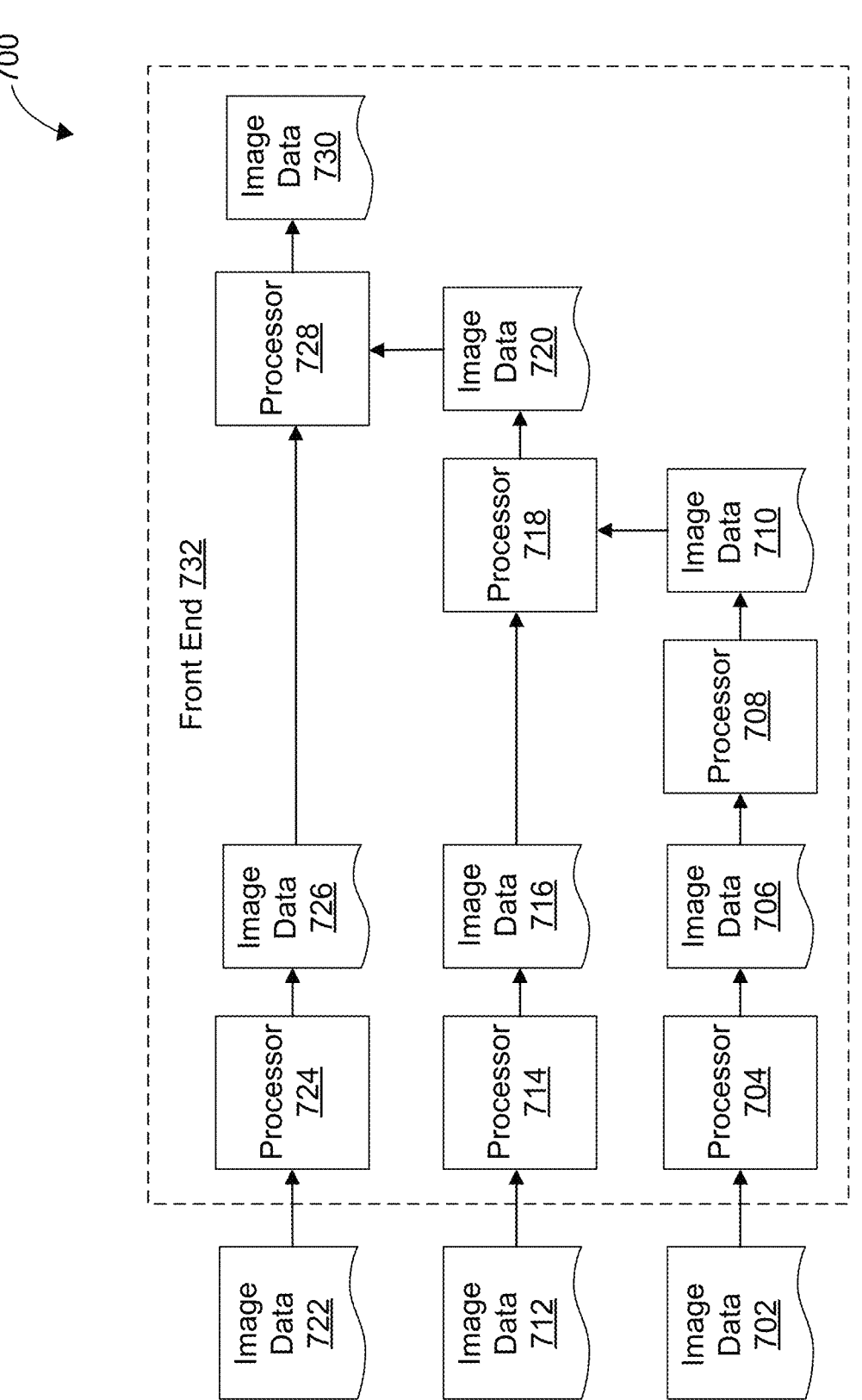
FIG. 7 is a block diagram illustrating an example system that may perform multi-stage image processing of foveated image data, according to various aspects of the present disclosure.

FIG. 7 is a block diagram illustrating an example system 700 that may perform multi-stage image processing of foveated image data, according to various aspects of the present disclosure. For example, system 700 may obtain image data 702, image data 712 and image data 722 (which may be foveated image data). System 700 may process image data 702 to generate image data 710, process image data 712 based on image data 710 to generate image data 720 and process image data 722 based on image data 720 to generate image data 730.

Image data 702, image data 712 and image data 722 may be, or may include, foveated image data. For example, image data 702 may be, or may include, rows of image data representing a field of view at a first resolution. For example, periphery 508 of FIG. 5A and FIG. 5B may be an example of image data 702. Image data 712 may be, or may include, rows of image data representing a first portion of the field of view at a second resolution. The second resolution may be greater than the first resolution. For example, periphery 506 of FIG. 5A and FIG. 5B may be an example of image data 712. Image data 722 may be, or may include, rows of image data representing a second portion of the field of view at a third resolution. The third resolution may be greater than the second resolution. The second portion of the field of view may be smaller than the first portion. For example, periphery 508 of FIG. 5A and FIG. 5B may be an example of image data 722.

System 700 may obtain image data 702, image data 712, and image data 722 in a row-by-row fashion (e.g., one row at a time), for example, as the rows are transferred from an image sensor. As rows are received, system 700 may buffer and process the rows according to the processing of processor 704, processor 708, processor 714, processor 718, processor 724, and processor 728. For example, processor 708 may apply a 5×5 kernel to image data 706. Accordingly, system 700 may buffer five rows of image data 706 so that processor 708 may process five rows of stored image data 706 to output one row of image data 710.

System 700 include front end 732, which may be, or may include, a multi-context front end image signal processor. As such, front end 732 may be capable of processing image data in multiple contexts (e.g., streams) in a simultaneous fashion (or a multi-threaded fashion that appears simultaneous). For example, front end 732 may process image data 702, image data 712 and image data 722 at substantially the same time (e.g., in a multi-threaded fashion).

Further, front end 732 may receive image data 702, image data 712, and image data 722 at substantially the same time.

For example, front end 732 may receive rows of image data 702 at the same time as, for example, in different data streams.

Processor 704 may process image data 702 to generate image data 706. Similarly, processor 714 may process image data 712 to generate image data 716 and processor 724 may process image data 722 to generate image data 726. Processor 704, processor 714, and processor 724 may, among other things perform operations related to, for example, lens-shading correction, demosaicing, color conversion, bad-pixel correction, data linearization, companding, decompanding, black-level correction, gamma adjustment, and/or chromatic-aberration correction.

Processor 708 may process image data 706 to generate image data 710. Processor 718 may process image data 716 and image data 710 to generate image data 720. Processor 728 may process image data 726 and image data 720 to generate image data 730.

In some aspects, image data 710 may include image data and a mask. Image data may be used in blending of the image data (e.g., the blending of image data of 710 with image data of image data 716). The blending may be performed before or after the processing of the other image data. For example, in some aspects, the image data of image data 710 may be blended with image data 716 before the blended image data is processed by processor 718. In other aspects, image data 716 may be processed by processor 718 and the processed image data may be blended with the image data of image data 710. In still other aspects, the blending may be performed in stages, for example, some portion of the image data (e.g., the image data of image data 710 and image data 716) could be blended before processing (e.g., at processor 718) and some portion could be blended after processing. The image data of image data 710 may be rendered on a display at its respective location or subject to further processing before being rendered on a display at its respective location.

The mask of image data 710 may be a pixel map. The mask of image data 710 may be used to adjust the kernel of subsequent stages of processing and/or maybe used to aid generation of a new map in the subsequent stages. For example, the mask of image data 710 may be used when processing image data 716 to adjust a kernel of processor 718 and/or in the generation of a mask of image data 720. As an example, the mask of image data 710 may provide information of edge, texture, flatness, brightness etc. Therefore, front end 732 may boost/de-boost the kernel coefficients for various regions or not use pixel of various regions for denoising. In that sense, the mask may act as a guide to subsequent processing.

Similarly, image data 720 may include image data and a mask. Processor 728 may use the image data and the mask when processing image data 726 in substantially the same way that processor 718 uses the image data and mask of image data 710 when processing image data 716. Image data 720 may be rendered on a display at its respective location or subject to further processing before being rendered on a display at its respective location.

Image data 730 may, or may not, include a mask. Because there may be no downstream processing of image data 730 in front end 732, in some aspects, image data 730 may exclude a mask. In other aspects, image data 730 may include a mask.

The processing of image data 706, image data 710, image data 716, image data 720, and image data 726 by processor 708, processor 718, and processor 728 is an example of multi-stage image processing. For example, the image data 720 (e.g., the results of a second stage) may be based on image data 710 (e.g., the results of a first stage) and image data 730 (e.g., the results of a third stage) may be based on image data 720 (e.g., the results of a second stage).

Processor 708, processor 718, and processor 728 may perform kernel-based operations. For example, each of processor 708, processor 718, and processor 728 may use a respective kernel to process image data 706, image data 716 and image data 710, and image data 726 and image data 720 respectively. Processor 708 may buffer rows of image data 706 according to the kernels of processor 708 such that processor 708 has the appropriate number of rows to process (e.g., based on the size of the kernels of processor 708). Similarly, processor 718 may buffer rows image data 716 based on a kernel of processor 718 and processor 728 may buffer rows of image data 726 based on a kernel of processor 728.

The multi-stage image processing of processor 708, processor 718, and processor 728 may be, or may include, multi-resolution denoising, tone mapping, and/or multi-scale feature extraction. For example, processor 708, processor 718, and processor 728 may apply respective denoising kernels to image data 706, image data 716, and image data 726 respectively. For instance, processor 708, processor 718, and processor 728 may apply respective averaging filters, editable filters, adaptive filters, bilateral filters, and/or custom kernels to image data 706, image data 716, and image data 726 respectively.

As another example, processor 708, processor 718, and processor 728 may map colors of image data 706, image data 716, and image data 726 respectively to other colors. For example, processor 708 may scale a dynamic range of pixel values of image data 706 to a different dynamic range when generating image data 710. Multi-scale local tone mapping works in bottom-to-top fashion (e.g., lowest resolution to highest resolution). Multi-scale local tone mapping uses an M×N kernel to process in each stage. Along with the image data, multi-scale local tone mapping also outputs masks (similar to masks for described relative to denoising). The masks may be used by subsequent stages (higher resolution stages).

In some aspects, processor 718 may process image data 716 (e.g., with a kernel of processor 718) to generate intermediate image data, then merge (or blend) the intermediate image data with image data 710 (or an upscaled version of image data 710) to generate image data 720. In other aspects, processor 718 may merge (or blend) image data 710 (or an upscaled version of image data 710) with image data 716 to generate intermediate image data, then process the intermediate image data (e.g., with the kernel of processor 718) to generate image data 720. In still other aspects, processor 718 may merge (or blend) image data 710 (or an upscaled version of image data 710) with image data 716 to generate first intermediate image data, process the first intermediate image data (e.g., with a kernel of processor 718) to generate second intermediate image data, then merge (or blend) the second intermediate image data with image data 710 (or an upscaled version of image data 710) to generate image data 720. In still other aspects, processor 718 may process image data 716 based on image data 710 (for example, processor 718 may use image data 710 as a guide in processing image data 716). Processor 728 may process image data 726 and image data 720 according to any of the aspects described with regard to processor 718.

System 700 may process image data 702, image data 712, and image data 722 as image data 702, image data 712, and image data 722 are received. For example, front end 732 may process image data 702, image data 712, and image data 722 in a row-by-row fashion. For instance, system 700 may process rows of image data 702 while additional rows of image data 702 are being received. For example, after buffering a suitable number of rows of image data 702, processor 704 may process the rows of image data 702 to generate rows of image data 706 and processor 708 may process the rows of image data 706 to generate rows of image data 710. System 700 may receive and buffer rows of image data 702 to have enough rows of image data 702 for operations of processor 704. Additionally or alternatively, system 700 may buffer image data 706 to have enough rows of image data 706 for operations of processor 708. Yet, system 700 may not wait to receive an entirety of the image of image data 702 before beginning processing image data 702. As such, system 700 may process rows of image data 702 while receiving additional rows of image data 702. In this way, system 700 may process image data 702, image data 712, and image data 722 as image data 702, image data 712, and image data 722 are received, for example, in real time.

Likewise, system 700 may process rows of image data 712 while receiving additional rows of image data 712 (and/or of image data 702). In some cases, processor 718 may wait to process image data 716 until a particular row of image data 710 (e.g., a row matching a center row of a window of rows) (or a suitable number of rows of image data 710) have been generated by processor 708 (e.g., based on system 700 receiving a suitable number of rows of image data 706 to process at processor 708). As such, processor 718 may buffer rows of image data 716 while processor 718 waits for a particular row (or a suitable number of rows) of image data 710 before processing image data 716. Yet, processor 718 may not wait for an entirety of the image of image data 716 and/or of image data 710 to be received before processing image data 716.

Processor 718 may wait and store line buffers because an incoming rate of image data 716 may be higher than that of image data 706. For a particular row, processor 718 may depend on the output of processor 708 for the corresponding row. Therefore processor 718 may store the additional incoming rows of image data 716 until the time processor 708 processes the corresponding row. In other words, processor 718 may buffer rows of image data 716 while processor 718 waits for processor 708 to generate the corresponding row (or suitable number of rows) of image data 710. Because the processed row of data 710 is consumed by processor 718 as soon as it is received, processor 718 may need storage for only this 1 row of processed data 710. Yet, because processor 718 may receive image data 716 at a higher rate than processor 718 receives image data 710 (based on processor 708 receiving image data 706 at a lower rate than processor 718 receives image data 716), processor 718 may buffer several rows of image data 716. In case, the processed image data 710 may upscaled by processor 718 using bilinear interpolation, processor 718 may store 2 more rows of processed data 710 apart from the current row, 1 row before the current row and 1 row after the current row.

In a similar fashion, system 700 may process rows of image data 722 while receiving additional rows of image data 722 (and/or of image data 712 and image data 702). In some cases, processor 728 may wait to process image data 726 until a particular row of image data 720 (e.g., a row matching a center row of window of rows) (or a suitable number of rows of image data 720) have been generated by processor 718 (e.g., based on system 700 receiving a suitable number of rows of image data 716 to process at processor

718 and based on system 700 receiving a suitable number of rows of image data 706 to process at processor 708). As such, processor 728 may buffer rows of image data 726 while processor 728 waits for a particular row (or a suitable number of rows) of image data 720 before processing image data 726. Yet, processor 728 may not wait for an entirety of the image of image data 726 and/or of image data 720 to be received before processing image data 726.

Processor 728 may wait and store line buffers because an incoming rate of image data 726 may be higher than that of image data 716. For a particular row, processor 728 may depend on the output of processor 718 for the corresponding row. Therefore processor 728 may store the additional incoming rows of image data 726 until the time processor 718 processes the corresponding row. In other words, processor 728 may buffer rows of image data 726 while processor 728 waits for processor 718 to generate the corresponding row (or suitable number of rows) of image data 720. Because the processed row of data 720 is consumed by processor 728 as soon as it is received, processor 728 may need storage for only this 1 row of processed data 720. Yet, because processor 728 may receive image data 726 at a higher rate than processor 728 receives image data 720 (based on processor 718 receiving image data 716 at a lower rate than processor 728 receives image data 726), processor 728 may buffer several rows of image data 726. In case, the processed image data 720 may upscaled by processor 728 using bilinear interpolation, processor 728 may store 2 more rows of processed data 720 apart from the current row, 1 row before the current row and 1 row after the current row.

Figure 8A:
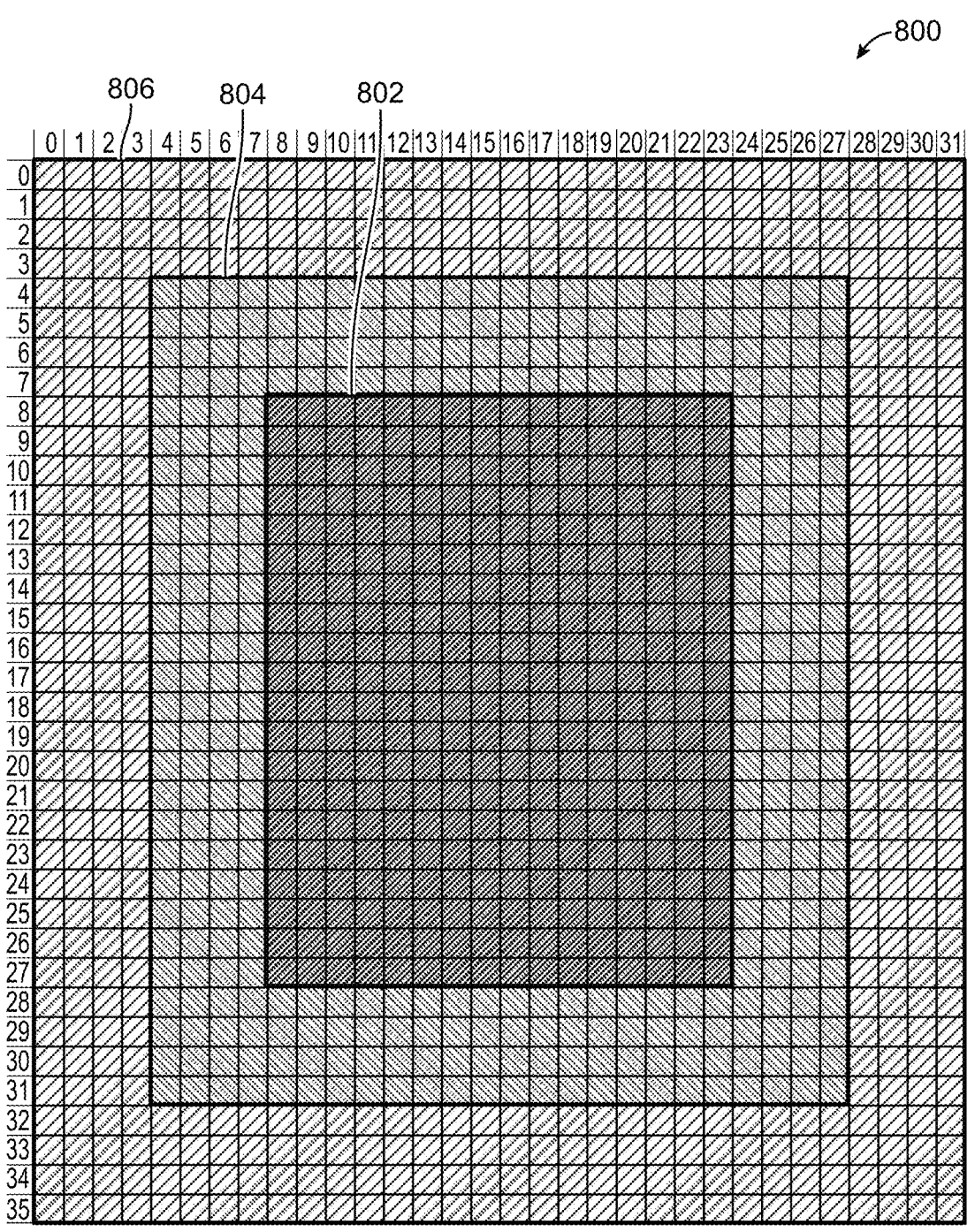
FIG. 8A is a diagram illustrating an example image frame 800.

FIG. 8A is a diagram illustrating an example image frame 800. Image frame 800 is divided into a region-of-interest (ROI) 802, a peripheral region 804, and a peripheral region 806. Image frame 800 has dimensions of 32×36. Pixel values of ROI 802 may be an example of image data 722 of FIG. 7, pixel values of peripheral region 804 may be an example of image data 712 of FIG. 7, and pixel values of peripheral region 806 may be an example of image data 702 of FIG. 7.

As mentioned previously, image data of each context may be received in a row-by-row fashion. For example, when a sensor is capturing rows of image 800 that correspond to region 806 the result is 1 output from the sensor corresponding to region 806. 4 rows of image 800 corresponding to 1 row of image 806 (considering a downscale ratio of 4). When the sensor is capturing rows 4-7 of image 800 that correspond to both images 806 and 804 the result is 2 different outputs from the sensor, one of the outputs corresponding to region 806 and the other corresponding to region 804. 4 rows of image 800 correspond to 1 row of region 806 and 2 rows of image 800 correspond to 1 row of region 804. Similarly, for rows 8-27, 20 rows correspond to region 802, 10 rows corresponding to region 804 and 5 rows corresponding to region 806. It is in these common regions (common between 806 and 804 and among 806, 804 and 802) that the multi-stage processing can be used.

Figure 8B:
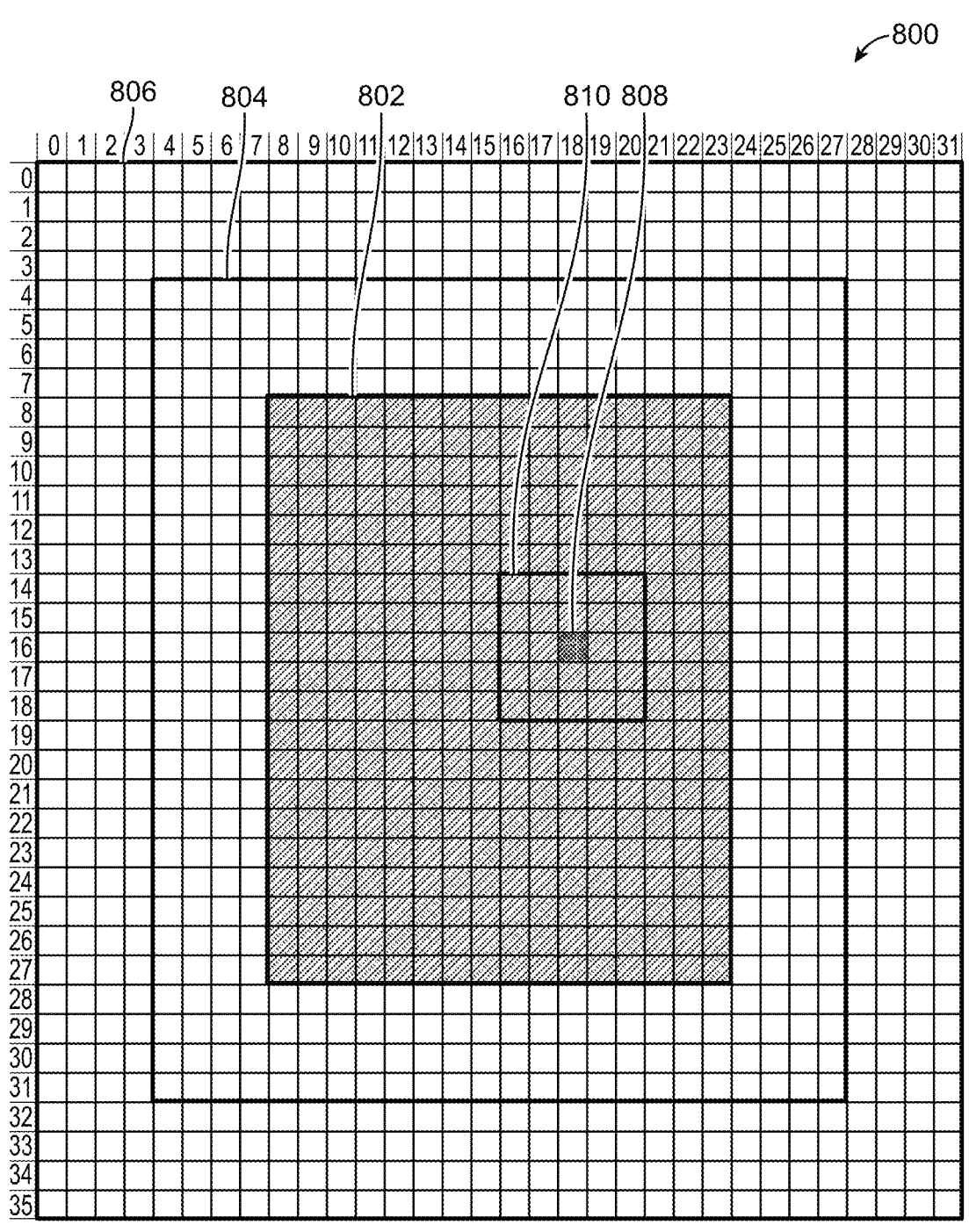
FIG. 8B is a diagram illustrating the example image frame of FIG. 8A including a region of interest (ROI) and two peripheral regions.

FIG. 8B is a diagram illustrating example image frame 800 of FIG. 8A including ROI 802, peripheral region 804, and peripheral region 806. In FIG. 8B, ROI 802 is illustrated with pixel values of image data representative of ROI 802 shaded. For example, image data representing ROI 802 may include one pixel value for each pixel of image frame 800 between coordinates (8, 8) and (23, 27) (e.g, in coordinates defined according to image frame 800).

System 700 of FIG. 7 may perform spatial denoising using a number of N×N kernels (e.g., one N×N kernel at each of processor 708, processor 718, and processor 728).

To achieve that, system 700 may buffer at least N rows of ROI 802, peripheral region 804, and peripheral region 806 respectively to do convolution with the N×N kernel. Spatial denoising in each Front-End context/HW instance may buffer N rows of data for that context. For example, for processor 728 to process N rows of image data 726 (where pixel values representative of ROI 802 are an example of image data 726), system 700 may buffer N rows of ROI 802.

Figure 8C:
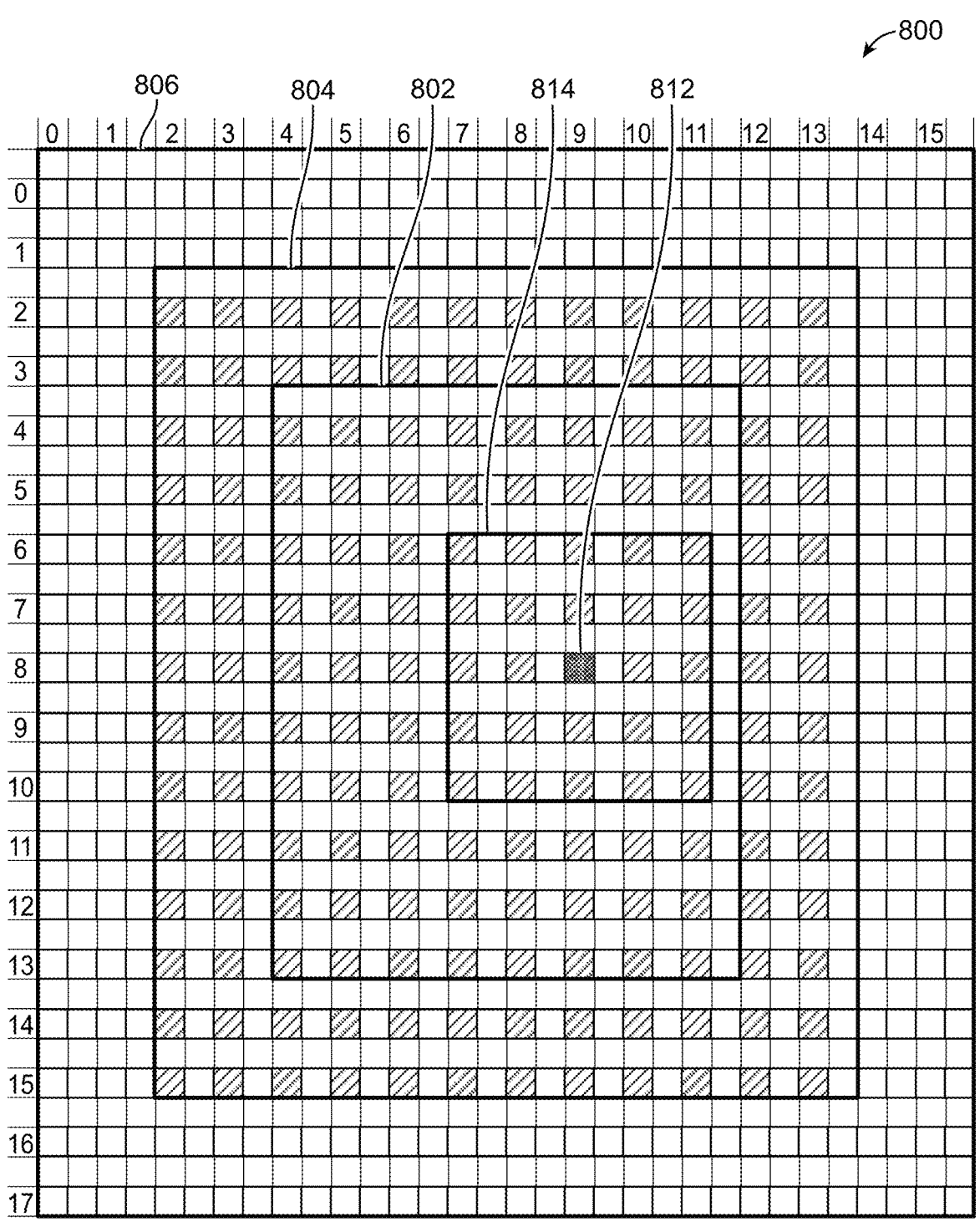
FIG. 8C is a diagram illustrating the example image frame of FIG. 8A including a region of interest (ROI) and two peripheral regions.

FIG. 8C is a diagram illustrating example image frame 800 of FIG. 8A including ROI 802, peripheral region 804, and peripheral region 806. In FIG. 8C, peripheral region 804 is illustrated with pixel values of image data representative of peripheral region 804 shaded. For example, image data representing peripheral region 804 may include one pixel value out of every four pixel values of image frame 800 between coordinates (4, 4) and (27, 31) (as the coordinates are counted in image frame 800 as illustrated by FIG. 8A). Peripheral region 804 have one quarter of the resolution of ROI 802 (e.g., based on a 2× width and a 2× height scaling difference between ROI 802 and peripheral region 804).

Image data representing peripheral region 804 may include pixels arranged in a 12×14 grid, for example, the shaded pixels without the intervening white rows and columns. The intervening rows and columns are illustrated to illustrate a relationship between pixel values of peripheral region 804 and pixel values of image frame 800.

Figure 8D:
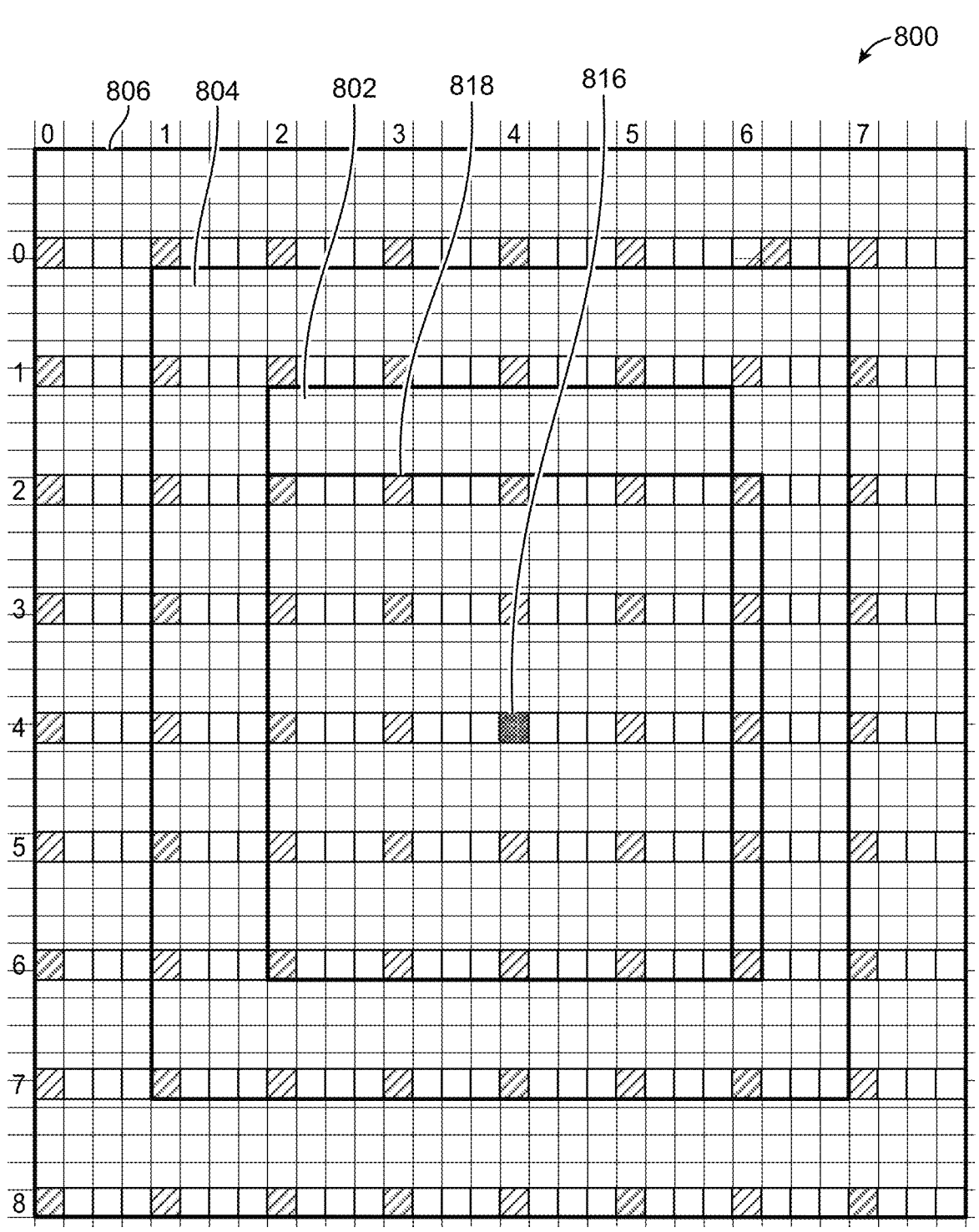
FIG. 8D is a diagram illustrating the example image frame of FIG. 8A including a region of interest (ROI) and two peripheral regions.

FIG. 8D is a diagram illustrating example image frame 800 of FIG. 8A including ROI 802, peripheral region 804, and peripheral region 806. In FIG. 8D, peripheral region 806 is illustrated with pixel values of image data representative of peripheral region 806 shaded. For example, image data representing peripheral region 806 may include one pixel value out of every sixteen pixel values of image frame 800 between coordinates (0, 0) and (31, 35) (as the coordinates are counted in image frame 800 as illustrated by FIG. 8A). Peripheral region 806 have one quarter of the resolution of peripheral region 804 (e.g., based on a 2× width and a 2× height scaling difference between peripheral region 804 and peripheral region 806).

Image data representing peripheral region 806 may include pixels arranged in an 8×9 grid, for example, the shaded pixels without the intervening white rows and columns. The intervening rows and columns are illustrated to illustrate a relationship between pixel values of peripheral region 806 and pixel values of image frame 800.

The value of pixel 816 may be determined based on the values of the pixels of window 818, for example, the value of pixels from 2,2 to 6,6 of FIG. 8D. Because pixel data is received row by row, pixel 816 may be based on pixels of rows 2 to row 6 of FIG. 8D. For example, processor 708 of FIG. 7 may determine a new value of pixel 816 based on a kernel, such as a 5×5 kernel, and values of pixels within window 818. The shaded pixels of FIG. 8D may be an example of pixels of image data 702 of FIG. 7.

Returning to FIG. 8C, the value of pixel 812 may be determined based on the values of the pixels of window 814, for example, the values of pixels from 7,6 to 11,10. Because pixel data is received row by row, pixel 812 may be based on pixels of rows 6 to 10 of FIG. 8C. For example, processor 718 of FIG. 7 may determine a new value of pixel 812 based on a kernel, such as a 5×5 kernel, and values of pixels within window 814. The shaded pixels of FIG. 8C may be an example of pixels of image data 712 of FIG. 7.

Additionally, the value of pixel 812 may be determined based on the value of pixel 816 of FIG. 8D. For example, pixel 816 of FIG. 8D may relate to pixel 812 of FIG. 8C. For instance pixel 816 of FIG. 8D may be the closest pixel of FIG. 8D to 812 of FIG. 8C. As mentioned previously, the value of pixel 816 may be based on rows 2 to 6 of FIG. 8D. A processor, (e.g., processor 718 of FIG. 7) may receive rows 5 to 13 of FIG. 8C while waiting for another processor, (e.g., processor 708 of FIG. 7) to generate the value of pixel 816 because the other processor may wait to receive rows 2 to 6 of FIG. 8D and rows 2 to 6 of FIG. 8D may relate to rows 5 to 13 of FIG. 8C. The relation between rows 2 to 6 of FIG. 8D and 5 to 13 of FIG. 8C may be based on a time it take to receive rows 2 to 6 of FIG. 8D and rows 5 to 13 of FIG. 8C. For example, row 6 of FIG. 8D may be received at substantially the same time row 13 of FIG. 8C is received. While waiting to receive the value of pixel 816, the processor may buffer up to row 13 of FIG. 8C.

Returning to FIG. 8B, the value of pixel 808 may be determined based on the values of the pixels of window 810, for example, the values of pixels from 16,14 to 20,18. Because pixel data is received row by row, pixel 808 may be based on pixels of rows 14 to 18 of FIG. 8B. For example, processor 728 of FIG. 7 may determine a new value of pixel 808 based on a kernel, such as a 5×5 kernel, and values of pixels within window 810. The shaded pixels of FIG. 8B may be an example of pixels of image data 722 of FIG. 7.

Additionally, the value of pixel 808 may be determined based on the value of pixel 812 of FIG. 8C. For example, pixel 812 of FIG. 8C may relate to pixel 808 of FIG. 8B. For instance pixel 812 of FIG. 8C may be the closest pixel of FIG. 8C to 808 of FIG. 8B.

As mentioned previously, the value of pixel 812 may be based on rows 5 to 13 of FIG. 8C because the processor that determines the values of pixel 812 may await the value of pixel 816. Thus, a processor, (e.g., processor 728 of FIG. 7) may receive rows 10 to 27 of FIG. 8B while waiting for another processor, (e.g., processor 718 of FIG. 7) to generate the value of pixel 812 because the other processor may wait to receive pixel value 816 from yet another processor which may wait to receive rows 2 to 6 of FIG. 8D. Rows 2 to 6 of FIG. 8D may relate to rows 5 to 13 of FIG. 8C and to rows 10 to 27 of FIG. 8B. The relation between rows 2 to 6 of FIG. 8D, 5 to 13 of FIG. 8C, and rows 10 to 27 of FIG. 8B may be based on a time it take to receive rows 2 to 6 of FIG. 8D, rows 5 to 13 of FIG. 8C, and rows 10 to 27 of FIG. 8B. For example, row 6 of FIG. 8D may be received at substantially the same time as row 13 of FIG. 8C is received and row 27 of FIG. 8B is received. While waiting to receive the value of pixel 812, the processor may buffer up to row 27 of FIG. 8B.

An example is given including a kernel of size N×N, in a three-stage set up, with a scaling factor of X1 between the top stage and the next stage and a scaling factor of X2 between the top stage and the bottom stage. A third-stage processor, (e.g, processor 708) may process a first periphery region 806 using an N×N kernel for which processor 708 may store N rows of third-stage image data 706. The N rows of image data 706 include: 1 current row currently being processed+(N−1)/2 rows before the current row+(N−1)/2 rows after the current row. For example, the third-stage processor may use (N−1)/2 previous rows (e.g., rows 2 and 3 of peripheral region 806 of FIG. 8D), a current row (e.g., row 4 of peripheral region 806 of FIG. 8D), and (N−1)/2 next rows (e.g., rows 5 and 6 of peripheral region 806 of FIG. 8D) of third-stage image data (e.g., image data 706).

An output of the third-stage processor (e.g., processor 708) may be, or may include, image data (e.g., image data 710) and/or a mask derived from the image data to be used in processing of periphery region 804 by processor 718.

Image data 710, output of processor 708, may be rendered on a display or further processed to be rendered on a display.

A second-stage processor (e.g., processor 718) may use N rows of second-stage image data (e.g., image data 716) to determine values for a row of pixels. The N rows of second-stage image data may include (N–1)/2 previous rows (e.g., rows 6 and 7 of window 814 of FIG. 8C), a current row (e.g., row 8 of window 814 of FIG. 8C), and (N–1)/2 next rows (e.g., rows 9 and 10 of window 814 of FIG. 8C) of second-stage image data (e.g., image data 716).

Additionally, the second-stage processor (e.g., processor 718) may wait while the third-stage processor (e.g., processor 708) determines a value for pixel 816. To determine the value for pixel 816, the third-stage processor may use rows 2 to 6 of FIG. 8D. While the third stage-processor receives rows 2 to 6 of third-stage image data of FIG. 8D, the second-stage processor may receive rows 5 to 13 and may buffer rows 6 to 13 of second-stage image data of FIG. 8C.

Thus, by the time the second-stage processor (e.g., processor 718) determines pixel values for the current row (e.g., row 8 of FIG. 8C), the second-stage processor may receive rows 5-13 and may buffer from row 6 (e.g., (N–1)/2) before the current row) to row 13 (e.g., (N+1)/2*X2/X1–1 after the current row) of second-stage image data of FIG. 8C.

An output of the second-stage processor (e.g., processor 718) may be, or may include, image data (e.g., image data 720) and/or a mask derived from the image data to be used in processing of ROI 802 by processor 728. Image data 720, output of processor 718, may be rendered on a display or further processed to be rendered on a display.

The first-stage processor (e.g., processor 728) may use N rows of image data to determine values for a row of pixels. The N rows of image data may include (N–1)/2 previous rows (e.g., rows 14 and 15 of window 810 of FIG. 8B), a current row (e.g., row 16 of window 810 of FIG. 8B), and (N–1)/2 next rows (e.g., rows 17 and 18 of window 810 of FIG. 8B) of first-stage image data (e.g., image data 726).

Additionally, the first-stage processor (e.g., processor 728) may wait while a second-stage processor (e.g., processor 718) determines a value for pixel 812. To determine the value for pixel 812, the second-stage processor may rows 6 to 10 of FIG. 8C of second-stage image data (e.g., image data 716). While the second-stage processor receives rows 6 to 10 of FIG. 8C, the first-stage processor may receive rows 13 to 21 and may buffer rows 14 to 21 of FIG. 8B.

Further, the first-stage processor (e.g., processor 728) may wait while the second-stage processor (e.g., processor 718) waits while the third-stage processor (e.g., processor 708) determines a value for pixel 816. To determine the value for pixel 816, the third-stage processor may use rows 2 to 6 of FIG. 8D. While the third stage-processor receives rows 2 to 6 of third-stage image data of FIG. 8D, the first-stage processor may receive rows 11 to 27 and may buffer rows 14 to 27 of first-stage image data of FIG. 8B.

Thus, by the time the first-stage processor (e.g., processor 728) determines pixel values for the current row (e.g., row 16 of FIG. 8C), the first-stage processor may receive rows 11 to 27 and may buffer from row 14 (e.g., (N–1)/2) before the current row) to row 27 (e.g., (N+1)/2*X2–1 after the current row) of first-stage image data of FIG. 8D.

An output of the first-stage processor (e.g., processor 728) may be, or may include, image data (e.g., image data 730) and/or a mask derived from the image data to be used in further processing image data (e.g., not illustrated in FIG. 7 or FIGS. 8A-8D). Image data 730, output of processor 728, may be rendered on a display or further processed to be rendered on a display.

An output of processor 708 (e.g., image data 710) may be, or may include, image data and/or a mask derived from the image data to be used in processing of periphery region 804 by the processor 718. The image data output of processor 708 may be rendered on a display or further processed to be rendered on a display. The processed data from processor 708, image data 710 and/or the mask derived from image data, may be passed on to processor 718. Processor 718 may use this data from processor 708 to process the corresponding pixel in periphery region 804.

In a normal scenario, processor 718 may store N rows of image data 716 to process a pixel using an N×N kernel. However, since processing in processor 718 depends on output from processor 708 and image 716 is X2/X1 times larger than image 706 in each direction (i.e., for every row of image 706, processor 718 is getting 2 rows of image 706), processor 718 needs to buffer more lines of image 716 while it waits for processor 708 to process the corresponding pixel in image 706. The number of lines of image 716 that need to be stored by processor 718 is: (N–1)/2+(N+1)/2*X2/X1 which include: 1 current row+(N–1)/2 rows before the current row+at max, (N+1)/2*X2/X1–1 rows after the current row.

Similarly, Processor 728 may wait until processor 718 processes the corresponding pixel in periphery 804 which in turn waits for processor 708 to process the corresponding pixel in region 806. Therefore, the number rows of image data 726 that need to be buffered in processor 728 is driven by the downscale ratio, X2 of the lowest resolution. The number of rows of image data 726 that need to be buffered in processor 728 is: (N–1)/2+(N+1)/2*X2 which include: 1 current row+(N–1)/2 rows before the current row+(N+1)/2*X2–1 rows after the current row.

In case output of third stage processor (e.g. image data 710) is upscaled using bilinear interpolation inside processor 718 and output of second stage processor (e.g. image data 720) is upscaled using bilinear interpolation inside processor 728, line buffer requirement may change. In such case, processed output for the row next to current row (along with the processed previous row) is also required which will increase the line buffers needed to be stored. Accordingly, processor 718 may buffer X2/X1 additional rows of image data 716 and processor 728 may buffer X2 additional rows of image data 726. So, the number of lines of image data 716 that may be stored by processor 718 is: (N–1)/2+(N+3)/2*X2/X1 which include: 1 current row+(N–1)/2 rows before the current row+at max, (N+3)/2*X2/X1–1 rows after the current row. Additionally, the number of rows of image data 726 that may be buffered in processor 728 is: (N–1)/2+(N+3)/2*X2 which include: 1 current row+(N–1)/2 rows before the current row+(N+3)/2*X2–1 rows after the current row.

Figure 9:
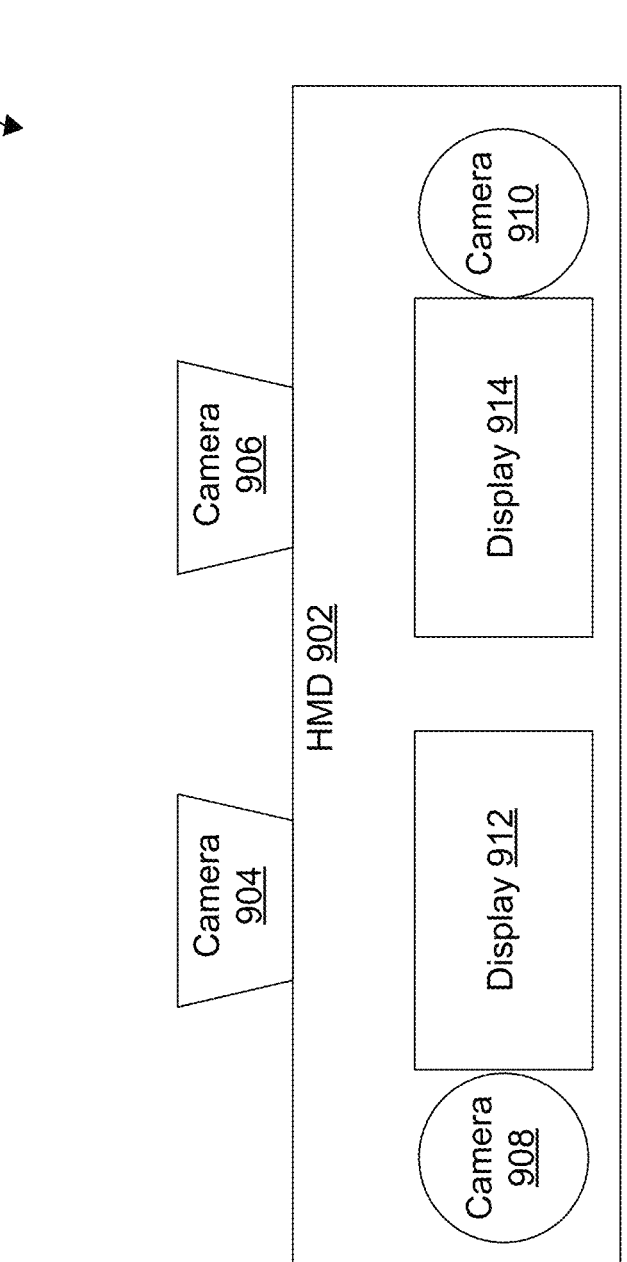
FIG. 9 illustrates an example system that may implement various aspects of the present disclosure.

FIG. 9 illustrates an example system 900 that may implement various aspects of the present disclosure. System 900 includes a head-mounted display (HMD) 902 that may perform the various operations described herein.

Extended reality (XR) may include virtual reality (VR), augmented reality (AR), and/or mixed reality (MR). Some XR head-mounted displays (HMDs) may implement video see through (VST). In VST, an XR HMD may capture images of a field of view of a user and display the images to the user as if the user were viewing the field of view directly. While displaying the images of the field of view, the XR HMD may alter or augment the images providing the user with an altered or augmented view of the environment of the user (e.g., providing the user with an XR experience). HMD 902 may be used for XR and may implement VST.

Foveated-image sensing may be useful in VST because foveated-image sensing may allow an XR HMD to conserve computational resources (e.g., power, processing time, communication bandwidth etc.). A foveated image of a field of view may be smaller in data size than a full-resolution image of the same field of view because the peripheral region may have lower resolution and may be stored using less data. Thus, capturing, storing, processing, and/or displaying a foveated image in VST rather than a full-resolution image may conserve computational resources.

HMD 902 may include one or more scene-facing cameras (e.g., camera 904 and camera 906). The scene-facing cameras may capture images of an environment of a user. Camera 904 may correspond to a first eye of a user and camera 906 may correspond to a second eye of the user.

HMD 902 may determine an ROI within images captured by the scene-facing cameras. For example, using image 502 of FIG. 5A as an example of an image captured by a scene-facing camera, HMD 902 may determine ROI 504 of FIG. 5A of image 502.

According to an example technique, HMD 902 may include one or more user-facing cameras (e.g., camera 908 and camera 910). The user-facing cameras may capture images of eyes of the user. HMD 902 may determine a gaze of the user based on the images of the eyes of the user. HMD 902 may determine an ROI within the images captured by the scene-facing cameras based on the gaze of the user. For example, HMD 902 may correlate a gaze of the user with a portion of images captured by the scene-facing cameras. Additionally or alternatively, HMD 902 may determine the ROI based on other scene input, app data, and/or scene analysis.

The scene-facing cameras may captured foveated image data. For example, HMD 902 may provide an indication of the ROI to the scene-facing cameras and the scene-facing cameras may capture images of the scene with a higher resolution in the ROI and a lower resolution outside the ROI.

HMD 902 may process the images captured by the scene-facing cameras based on the ROI as described herein. For example, HMD 902 may perform multi-resolution denoising on the images as described herein.

In some aspects, HMD 902 may display image data processed as described herein. For example, HMD 902 may display image data that has been processed according to various aspects of the present disclosure using at least one display (e.g., at display 912 and/or display 914).

In some aspects, HMD 902 may display the image data as a stereo pair (e.g., at display 912 and display 914). In some aspects, the stereo pair of images can be generated based on pairs of images that are captured from a pair of cameras. For example, camera 904 may capture images, HMD 902 may process the images as described herein, and display 912 may display the processed images. Additionally, camera 906 may capture images, HMD 902 may process the images as described herein, and display 914 may display the processed images. Alternatively, HMD 902 may capture images data using a single scene-facing camera, and crop and/or adjust the images to virtualize a stereo view.

FIG. 10 is a flow diagram illustrating a process 1000 for performing multi-stage image processing of foveated image data, in accordance with aspects of the present disclosure. One or more operations of process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1000. The one or more operations of process 1000 may be implemented as software components that are executed and run on one or more processors.

At block 1002, a computing device (or one or more components thereof) may receive a first plurality of rows of first image data, the first image data representing a field of view at a first resolution. For example, front end 732 of FIG. 7 may receive a plurality of rows of image data 702 which may be an example of periphery 508 of FIG. 5B.

At block 1004, the computing device (or one or more components thereof) may receive a second plurality of rows of second image data, the second image data representing a portion of the field of view at a second resolution, wherein the first resolution is less than the second resolution. For example, front end 732 may receive a plurality of rows of image data 712 which may be an example of periphery 506 of FIG. 5B.

At block 1006, the computing device (or one or more components thereof) may generate processed first image data based on the first plurality of rows of the first image data and a first kernel. For example, processor 708 may generate image data 710 based on image data 706 and a kernel of processor 708.

In some aspects, the computing device (or one or more components thereof) may receive additional rows of the first image data while generating the processed first image data. For example, front end 732 may receive additional rows of image data 702 while processing image data 706 at processor 708.

In some aspects, to generate the processed first image data, the computing device (or one or more components thereof) may denoise the first image data. For example, processor 708 may denoise image data 706.

In some aspects, to generate the processed first image data, the computing device (or one or more components thereof) may map at least one color of the first image data to at least one other color. For example, processor 708 may perform tone mapping on image data 706.

In some aspects, the first kernel may be, or may include, at least one of: an averaging filter; an editable filter; an adaptive filter; a bilateral filter; a custom kernel generated based on the first image data. For example, the kernel of processor 708 may be, or may include, an averaging filter; an editable filter; an adaptive filter; a bilateral filter; and/or a custom kernel generated based on the first image data.

At block 1008, the computing device (or one or more components thereof) may generate processed second image data based on the second plurality of rows of the second image data, a second kernel, and the processed first image data. For example, processor 718 may generate image data 720 based on image data 716 and image data 710.

In some aspects, to generate the processed second image data, the computing device (or one or more components thereof) may blend the second image data with the processed first image data to generate intermediate image data.

In some aspects, the computing device (or one or more components thereof) may process the intermediate image data using the second kernel to generate the processed second image data.

In some aspects, the second kernel may be, or may include, a spatial filter, and wherein, to process the intermediate image data using the second kernel, the computing device (or one or more components thereof) may filter the intermediate image data using the spatial filter.

In some aspects, to generate the processed second image data, the computing device (or one or more components thereof) may: process the second image data using the second kernel to generate intermediate image data; and blend the intermediate image data with the processed first image data to generate the processed second image data.

In some aspects, the second kernel may be, or may include, a spatial filter, and wherein, to process the intermediate image data using the second kernel, the computing device (or one or more components thereof) may filter the intermediate image data using the spatial filter.

In some aspects, to generate the processed second image data, the computing device (or one or more components thereof) may process the second image data using the second kernel based on the processed first image data.

In some aspects, the second kernel may be, or may include, a spatial filter, and wherein, to process the intermediate image data using the second kernel, the computing device (or one or more components thereof) may filter the intermediate image data using the spatial filter.

In some aspects, the portion of the field of view is smaller than the field of view. For example, periphery 506 may be smaller a full field of view of the camera which captured periphery 506.

In some aspects, the portion of the field of view is a first portion of the field of view, and the computing device (or one or more components thereof) may receive a third plurality of rows of third image data, the third image data representing a second portion of the field of view at a third resolution, wherein the second resolution is less than the third resolution, and wherein the first portion of the field of view is larger than the second portion of the field of view; and generate processed third image data based on the third plurality of rows of the third image data, a third kernel, and the processed second image data. For example, front end 732 may receive image data 722 and process image data 726 based on image data 720 to generate image data 730.

At block 1010, the computing device (or one or more components thereof) may output the processed first image data and the processed second image data. For example, front end 732 may output image data 720.

In some aspects, the computing device (or one or more components thereof) may display the processed first image data and the processed second image data at a display of a head-mounted display. For example, image data 720 may be displayed at display 912 and/or display 914 of HMD 902.

In some aspects, the processed first image data and the processed second image data may be, or may include, a first set of image data, and the computing device (or one or more components thereof) may: display the first set of image data at a first display of a head-mounted display; and display a second set of image data at a second display of the head-mounted display. For example, the computing device (or one or more components thereof) may display image data 720 at display 912 and generate additional data to display at display 914.

In some examples, as noted previously, the methods described herein (e.g., process 1000 of FIG. 10, and/or other methods described herein) can be performed, in whole or in part, by a computing device or apparatus. In one example, one or more of the methods can be performed by image-processing device 104 of FIG. 1, image processor 124 of FIG. 1, ISP 128 of FIG. 1, system 200 of FIG. 2, image processor 204 of FIG. 2, image processor 210 of FIG. 2, system 700 of FIG. 7, front end 732 of FIG. 7, processor

708, processor 718, and processor 728 of FIG. 7, or by another system or device. In another example, one or more of the methods (e.g., process 1000 of FIG. 10, and/or other methods described herein) can be performed, in whole or in part, by the computing-device architecture 1100 shown in FIG. 11. For instance, a computing device with the computing-device architecture 1100 shown in FIG. 11 can include, or be included in, the components of the image-processing device 104 of FIG. 1, image processor 124 of FIG. 1, ISP 128 of FIG. 1, system 200 of FIG. 2, image processor 204 of FIG. 2, image processor 210 of FIG. 2, system 700 of FIG. 7, front end 732 of FIG. 7, processor 708, processor 718, and processor 728 of FIG. 7 and can implement the operations of process 1000, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1000, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1000, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

FIG. 11 illustrates an example computing-device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1100 may include, implement, or be included in any or all of image-processing device 104 of FIG. 1, image processor 124 of FIG. 1, ISP 128 of FIG. 1, system 200 of FIG. 2, image processor 204 of FIG. 2, image processor 210 of FIG. 2, system 700 of FIG. 7, front end 732 of FIG. 7, processor 708, processor 718, and processor 728 of FIG. 7 and/or other devices, modules, or systems described herein. Additionally or alternatively, computing-device architecture 1100 may be configured to perform process 1000, and/or other process described herein.

The components of computing-device architecture 1100 are shown in electrical communication with each other using connection 1112, such as a bus. The example computing-device architecture 1100 includes a processing unit (CPU or processor) 1102 and computing device connection 1112 that couples various computing device components including computing device memory 1110, such as read only memory (ROM) 1108 and random-access memory (RAM) 1106, to processor 1102.

Computing-device architecture 1100 can include a cache of high-speed memory connected directly with, in close proximity to, or integrated as part of processor 1102. Computing-device architecture 1100 can copy data from memory 1110 and/or the storage device 1114 to cache 1104 for quick access by processor 1102. In this way, the cache can provide a performance boost that avoids processor 1102 delays while waiting for data. These and other modules can control or be configured to control processor 1102 to perform various actions. Other computing device memory 1110 may be available for use as well. Memory 1110 can include multiple different types of memory with different performance characteristics. Processor 1102 can include any general-purpose processor and a hardware or software service, such as service 1 1116, service 2 1118, and service 3 1120 stored in storage device 1114, configured to control processor 1102 as well as a special-purpose processor where software instructions are incorporated into the processor design. Processor 1102 may be a self-contained system, containing multiple cores or processors, a bus, memory controller, cache, etc. A multi-core processor may be symmetric or asymmetric.

To enable user interaction with the computing-device architecture 1100, input device 1122 can represent any number of input mechanisms, such as a microphone for speech, a touch-sensitive screen for gesture or graphical input, keyboard, mouse, motion input, speech and so forth. Output device 1124 can also be one or more of a number of output mechanisms known to those of skill in the art, such as a display, projector, television, speaker device, etc. In some instances, multimodal computing devices can enable a user to provide multiple types of input to communicate with computing-device architecture 1100. Communication interface 1126 can generally govern and manage the user input and computing device output. There is no restriction on operating on any particular hardware arrangement and therefore the basic features here may easily be substituted for improved hardware or firmware arrangements as they are developed.

Storage device 1114 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1106, read only memory (ROM) 1108, and hybrids thereof. Storage device 1114 can include services 1116, 1118, and 1120 for controlling processor 1102. Other hardware or software modules are contemplated. Storage device 1114 can be connected to the computing device connection 1112. In one aspect, a hardware module that performs a particular function can include the software component stored in a computer-readable medium in connection with the necessary hardware components, such as processor 1102, connection 1112, output device 1124, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set.

For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, the apparatus comprising: at least one memory; and at least one processor coupled to the at least one memory and configured to: receive a first plurality of rows of first image data, the first image data representing a field of view at a first resolution; receive a second plurality of rows of second image data, the second image data representing a portion of the field of view at a second resolution, wherein the first resolution is less than the second resolution; generate processed first image data based on the first plurality of rows of the first image data and a first kernel; generate processed second image data based on the second plurality of rows of the second image data, a second kernel, and the processed first image data; and output the processed first image data and the processed second image data.

Aspect 2. The apparatus of aspect 1, wherein the at least one processor is configured to receive additional rows of the first image data while generating the processed first image data.

Aspect 3. The apparatus of any one of aspects 1 or 2, wherein, to generate the processed first image data, the at least one processor is configured to denoise the first image data.

Aspect 4. The apparatus of any one of aspects 1 to 3, wherein, to generate the processed first image data, the at least one processor is configured to map at least one color of the first image data to at least one other color.

Aspect 5. The apparatus of any one of aspects 1 to 4, wherein the first kernel comprises at least one of: an averaging filter; an editable filter; an adaptive filter; a bilateral filter; a custom kernel generated based on the first image data.

Aspect 6. The apparatus of any one of aspects 1 to 5, wherein, to generate the processed second image data, the at least one processor is configured to blend the second image data with the processed first image data to generate intermediate image data.

Aspect 7. The apparatus of aspect 6, wherein the at least one processor is configured to process the intermediate image data using the second kernel to generate the processed second image data.

Aspect 8. The apparatus of aspect 7, wherein the second kernel comprises a spatial filter, and wherein, to process the intermediate image data using the second kernel, the at least one processor is configured to filter the intermediate image data using the spatial filter.

Aspect 9. The apparatus of any one of aspects 1 to 8, wherein, to generate the processed second image data, the at least one processor is configured to: process the second image data using the second kernel to generate intermediate image data; and blend the intermediate image data with the processed first image data to generate the processed second image data.

Aspect 10. The apparatus of aspect 9, wherein the second kernel comprises a spatial filter, and wherein, to process the second image data using the second kernel, the at least one processor is configured to filter the second image data using the spatial filter.

Aspect 11. The apparatus of any one of aspects 1 to 10, wherein, to generate the processed second image data, the at least one processor is configured to process the second image data using the second kernel based on the processed first image data.

Aspect 12. The apparatus of aspect 11, wherein the second kernel comprises a spatial filter, and wherein, to process the second image data using the second kernel, the at least one processor is configured to filter the second image data using the spatial filter.

Aspect 13. The apparatus of any one of aspects 1 to 12, wherein the portion of the field of view is smaller than the field of view.

Aspect 14. The apparatus of any one of aspects 1 to 13, wherein the portion of the field of view comprises a first portion of the field of view, and wherein the at least one processor is configured to: receive a third plurality of rows of third image data, the third image data representing a second portion of the field of view at a third resolution, wherein the second resolution is less than the third resolution, and wherein the first portion of the field of view is larger than the second portion of the field of view; and generate processed third image data based on the third plurality of rows of the third image data, a third kernel, and the processed second image data.

Aspect 15. The apparatus of any one of aspects 1 to 14, wherein the at least one processor is configured to display the processed first image data and the processed second image data at a display of a head-mounted display.

Aspect 16. The apparatus of any one of aspects 1 to 15, wherein the processed first image data and the processed second image data comprise a first set of image data, and wherein the at least one processor is configured to: display the first set of image data at a first display of a head-mounted display; and display a second set of image data at a second display of the head-mounted display.

Aspect 17. A method for processing image data, the method comprising: receiving a first plurality of rows of first image data, the first image data representing a field of view at a first resolution; receiving a second plurality of rows of second image data, the second image data representing a portion of the field of view at a second resolution, wherein the first resolution is less than the second resolution; generating processed first image data based on the first plurality of rows of the first image data and a first kernel; generating processed second image data based on the second plurality of rows of the second image data, a second kernel, and the processed first image data; and outputting the processed first image data and the processed second image data.

Aspect 18. The method of aspect 17, further comprising receiving additional rows of the first image data while generating the processed first image data.

Aspect 19. The method of any one of aspects 17 or 18, wherein generating the processed first image data comprises denoising the first image data.

Aspect 20. The method of any one of aspects 17 to 19, wherein generating the processed first image data comprises mapping at least one color of the first image data to at least one other color.

Aspect 21. The method of any one of aspects 17 to 20, wherein the first kernel comprises at least one of: an averaging filter; an editable filter; an adaptive filter; a bilateral filter; a custom kernel generated based on the first image data.

Aspect 22. The method of any one of aspects 17 to 21, wherein generating the processed second image data comprises blending the second image data with the processed first image data to generate intermediate image data.

Aspect 23. The method of aspect 22, further comprising processing the intermediate image data using the second kernel to generate the processed second image data.

Aspect 24. The method of aspect 23, wherein the second kernel comprises a spatial filter, and wherein processing the intermediate image data using the second kernel comprises filtering the intermediate image data using the spatial filter.

Aspect 25. The method of any one of aspects 17 to 24, wherein generating the processed second image data comprises: processing the second image data using the second kernel to generate intermediate image data; and blending the intermediate image data with the processed first image data to generate the processed second image data.

Aspect 26. The method of aspect 25, wherein the second kernel comprises a spatial filter, and wherein processing the second image data using the second kernel comprises filtering the second image data using the spatial filter.

Aspect 27. The method of any one of aspects 17 to 26, wherein generating the processed second image data comprises processing the second image data using the second kernel based on the processed first image data.

Aspect 28. The method of aspect 27, wherein the second kernel comprises a spatial filter, and wherein processing the second image data using the second kernel comprises filtering the second image data using the spatial filter.

Aspect 29. The method of any one of aspects 17 to 28, wherein the portion of the field of view is smaller than the field of view.

Aspect 30. The method of any one of aspects 17 to 29, wherein the portion of the field of view comprises a first portion of the field of view, the method further comprising: receiving a third plurality of rows of third image data, the third image data representing a second portion of the field of view at a third resolution, wherein the second resolution is less than the third resolution, and wherein the first portion of the field of view is larger than the second portion of the field of view; and generating processed third image data based on the third plurality of rows of the third image data, a third kernel, and the processed second image data.

Aspect 31. The method of any one of aspects 17 to 30, further comprising displaying the processed first image data and the processed second image data at a display of a head-mounted display.

Aspect 32. The method of any one of aspects 17 to 31, wherein the processed first image data and the processed second image data comprise a first set of image data, further comprising: displaying the first set of image data at a first display of a head-mounted display; and displaying a second set of image data at a second display of the head-mounted display.

Aspect 33. A non-transitory computer-readable medium having stored thereon instructions that, when executed by at least one processor, cause the at least one processor to perform operations according to any of Aspects 17 to 32.

Aspect 34. An apparatus for processing image data, the apparatus including one or more means for performing operations according to any of Aspects 17 to 32.

What is claimed is:

1. An apparatus for processing image data, the apparatus comprising:
   at least one memory; and
   at least one processor coupled to the at least one memory and configured to:
      receive, from an image sensor, a first plurality of rows of first image data, the first image data representing a field of view at a first resolution;
      receive, from the image sensor, a second plurality of rows of second image data, the second image data representing a portion of the field of view at a second resolution, wherein the first resolution is less than the second resolution;
      generate processed first image data based on the first plurality of rows of the first image data and a first kernel;
      generate processed second image data based on the second plurality of rows of the second image data, a second kernel, and the processed first image data; and
      output the processed first image data and the processed second image data.

2. The apparatus of claim 1, wherein the at least one processor is configured to receive additional rows of the first image data while generating the processed first image data.

3. The apparatus of claim 1, wherein, to generate the processed first image data, the at least one processor is configured to denoise the first image data.

4. The apparatus of claim 1, wherein, to generate the processed first image data, the at least one processor is configured to map at least one color of the first image data to at least one other color.

5. The apparatus of claim 1, wherein the first kernel comprises at least one of:
   an averaging filter;
   an editable filter;
   an adaptive filter;
   a bilateral filter; or
   a custom kernel generated based on the first image data.

6. The apparatus of claim 1, wherein, to generate the processed second image data, the at least one processor is configured to blend the second image data with the processed first image data to generate intermediate image data.

7. The apparatus of claim 6, wherein the at least one processor is configured to process the intermediate image data using the second kernel to generate the processed second image data.

8. The apparatus of claim 7, wherein the second kernel comprises a spatial filter, and wherein, to process the intermediate image data using the second kernel, the at least one processor is configured to filter the intermediate image data using the spatial filter.

9. The apparatus of claim 1, wherein, to generate the processed second image data, the at least one processor is configured to:
   process the second image data using the second kernel to generate intermediate image data; and
   blend the intermediate image data with the processed first image data to generate the processed second image data.

10. The apparatus of claim 9, wherein the second kernel comprises a spatial filter, and wherein, to process the second image data using the second kernel, the at least one processor is configured to filter the second image data using the spatial filter.

11. The apparatus of claim 1, wherein, to generate the processed second image data, the at least one processor is configured to process the second image data using the second kernel based on the processed first image data.

12. The apparatus of claim 11, wherein the second kernel comprises a spatial filter, and wherein, to process the second image data using the second kernel, the at least one processor is configured to filter the second image data using the spatial filter.

13. The apparatus of claim 1, wherein the portion of the field of view is smaller than the field of view.

14. The apparatus of claim 1, wherein the portion of the field of view comprises a first portion of the field of view, and wherein the at least one processor is configured to:
   receive a third plurality of rows of third image data, the third image data representing a second portion of the field of view at a third resolution, wherein the second resolution is less than the third resolution, and wherein the first portion of the field of view is larger than the second portion of the field of view; and
   generate processed third image data based on the third plurality of rows of the third image data, a third kernel, and the processed second image data.

15. The apparatus of claim 1, wherein the at least one processor is configured to display the processed first image data and the processed second image data at a display of a head-mounted display.

16. The apparatus of claim 1, wherein the processed first image data and the processed second image data comprise a first set of image data, and wherein the at least one processor is configured to:

display the first set of image data at a first display of a head-mounted display; and display a second set of image data at a second display of the head-mounted display.

17. A method for processing image data, the method comprising:

receiving, by one or more processors, a first plurality of rows of first image data from an image sensor, the first image data representing a field of view at a first resolution;

receiving, by the one or more processors, a second plurality of rows of second image data from the image sensor, the second image data representing a portion of the field of view at a second resolution, wherein the first resolution is less than the second resolution;

generating, by the one or more processors, processed first image data based on the first plurality of rows of the first image data and a first kernel;

generating, by the one or more processors, processed second image data based on the second plurality of rows of the second image data, a second kernel, and the processed first image data; and outputting, by the one or more processors, the processed first image data and the processed second image data.

18. The method of claim 17, further comprising receiving additional rows of the first image data while generating the processed first image data.

19. The method of claim 17, wherein generating the processed first image data comprises denoising the first image data.

20. The method of claim 17, wherein generating the processed first image data comprises mapping at least one color of the first image data to at least one other color.

\* \* \* \* \*